(12) United States Patent
Gupta et al.

(10) Patent No.: US 11,606,343 B2
(45) Date of Patent: *Mar. 14, 2023

(54) UTILIZING A CUSTOMIZED DIGITAL FONT TO IDENTIFY A COMPUTING DEVICE

(71) Applicant: Adobe Inc., San Jose, CA (US)

(72) Inventors: Piyush Gupta, Punjab (IN); Sourabh Goel, New Delhi (IN); Mansukh Patidar, Greater Noida (IN)

(73) Assignee: Adobe Inc., San Jose, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/402,930

(22) Filed: May 3, 2019

(65) Prior Publication Data

US 2019/0260728 A1    Aug. 22, 2019

Related U.S. Application Data

(63) Continuation of application No. 15/046,212, filed on Feb. 17, 2016, now Pat. No. 10,341,319.

(51) Int. Cl.
*H04L 9/40* (2022.01)
*H04L 67/02* (2022.01)
*G06F 40/109* (2020.01)

(52) U.S. Cl.
CPC ............ *H04L 63/08* (2013.01); *G06F 40/109* (2020.01); *H04L 63/102* (2013.01); *H04L 67/02* (2013.01); *H04L 63/168* (2013.01)

(58) Field of Classification Search
CPC ....... H04L 63/08; H04L 63/102; H04L 67/02; H04L 63/168; H04L 9/32; G06F 40/109
See application file for complete search history.

(56) References Cited

U.S. PATENT DOCUMENTS

| | | |
|---|---|---|
| 6,065,008 A | 5/2000 | Simon et al. |
| 6,209,103 B1 | 3/2001 | Schreiber et al. |
| 8,613,070 B1 | 2/2013 | Borzycki et al. |
| 8,705,835 B2 | 4/2014 | Hamasaki et al. |
| 9,146,907 B1* | 9/2015 | Joshi ............... G06F 40/109 |
| 2005/0094173 A1* | 5/2005 | Engelman ......... G06K 15/1827 358/1.11 |

(Continued)

OTHER PUBLICATIONS

Tu Bui et al. "Font Finder: Visual recognition of typeface in printed documents," 2015, pp. 3926-3930. (Year: 2015).*

(Continued)

*Primary Examiner* — Luu T Pham
*Assistant Examiner* — Canh Le
(74) *Attorney, Agent, or Firm* — Keller Preece PLLC

(57) ABSTRACT

Systems and methods are disclosed for securely identifying a computing device via a web browser utilizing a customized digital font. In particular, in one or more embodiments, the disclosed systems and methods generate a customized digital font and install the customized digital font on a computing device. Moreover, the disclosed systems and methods utilize the customized digital font to identify the computing device. In particular, one or more embodiments include systems and methods that identify an element of a webpage rendered by the computing device utilizing the customized digital font and identify the client device based on the rendered element of the webpage.

20 Claims, 18 Drawing Sheets

(56) References Cited

U.S. PATENT DOCUMENTS

| | | | |
|---|---|---|---|
| 2008/0253656 A1* | 10/2008 | Schwartzberg | G06K 9/3258 382/181 |
| 2011/0090230 A1 | 4/2011 | Bacus et al. | |
| 2011/0115797 A1 | 5/2011 | Kaplan | |
| 2012/0016964 A1* | 1/2012 | Veen | G06F 21/10 709/219 |
| 2012/0066590 A1* | 3/2012 | Harris | G06F 40/109 715/269 |
| 2012/0311342 A1* | 12/2012 | Nuzzi | G06F 21/31 713/182 |
| 2013/0215126 A1* | 8/2013 | Roberts | G06Q 30/06 345/522 |
| 2014/0047329 A1 | 2/2014 | Levantovsky et al. | |
| 2014/0136957 A1 | 5/2014 | Kaasila et al. | |
| 2014/0280693 A1* | 9/2014 | Schwanitz | H04L 67/04 709/217 |
| 2015/0074522 A1 | 3/2015 | Hamed, III et al. | |
| 2015/0262347 A1* | 9/2015 | Duerksen | G09G 5/24 382/182 |
| 2015/0301989 A1* | 10/2015 | Xin | G06F 40/109 715/234 |
| 2015/0319159 A1 | 11/2015 | Hameed et al. | |
| 2015/0348278 A1* | 12/2015 | Cavedoni | G06F 40/109 345/467 |
| 2016/0078004 A1* | 3/2016 | Butler | G06F 21/10 715/269 |
| 2016/0314377 A1 | 10/2016 | Vieira et al. | |
| 2017/0147535 A1 | 5/2017 | Cao et al. | |
| 2017/0237723 A1 | 8/2017 | Gupta et al. | |

OTHER PUBLICATIONS

Teddy Mantoro et al., "Optical Character Recognition (OCR) Performance in Server-based Mobile Environment," 2022, pp. 423-428. (Year: 2022).*

Bhonsale Tejas et al., "Number Plate Recognition and Document Verification Using Feature Extraction OCR Algorithm," IEEE, 2017, pp. 1317-1320. (Year: 2017).

M. M. Farhad, "An Efficient Optical Character Recognition Algorithm using Artificial Neural Network by Curvature Properties of Characters," IEEE, 2014, pp. 1-5 (Year: 2014).

U.S. Appl. No. 15/046,212, Nov. 3, 2017, 1st Action Office Action.
U.S. Appl. No. 15/046,212, Apr. 2, 2018, Office Action.
U.S. Appl. No. 15/046,212, Aug. 27, 2018, Office Action.
U.S. Appl. No. 15/046,212, Feb. 7, 2019, Notice of Allowance.

* cited by examiner

UTILIZING A CUSTOMIZED DIGITAL FONT TO IDENTIFY A COMPUTING DEVICE

CROSS REFERENCE TO RELATED APPLICATIONS

This application is a continuation of U.S. patent application Ser. No. 15/046,212, filed Feb. 17, 2016, which is hereby incorporated by reference in its entirety.

BACKGROUND

1. Technical Field

The present disclosure relates generally to identifying computing devices. More specifically, one or more embodiments of the present disclosure relate to systems and methods that utilize digital fonts to securely authorize computing devices.

2. Background and Relevant Art

Recent years have seen a rapid proliferation in the use of web-enabled devices to store and utilize information on remote, third-party servers. For example, individuals and businesses increasingly utilize smartphones, tablets, laptops, or personal computers to access applications or data stored on cloud-based systems. Indeed, it is now common for individuals to create electronic documents (such as word processing documents, PDFs, photographs, or video) via tablets or other web-enabled devices, and store the electronic documents on one or more cloud-based systems hosted by a third-party service provider.

In light of the growth of web-enabled devices and third-party servers, individuals and businesses increasingly utilize the web to manage their digital assets. For example, it is increasingly common for individuals to download software applications or other digital assets onto a client device (e.g., photo-editing software or a software management application), while also managing data or features corresponding to the software applications or other digital assets via a web browser (e.g., managing digital images stored on a remote server or managing software application subscriptions via a web browser). Accordingly, users seek systems that permit them to seamlessly transition between local applications and data and corresponding applications and data stored on the web. Moreover, users demand systems that maintain the security and privacy of client information entrusted to the cloud-based system.

Unfortunately, users often experience frustration in dealing with conventional cloud-based systems because they are incapable of securely identifying the client device via a web browser without the user providing various forms of identifying information. For example, after downloading digital assets from a conventional cloud-based system, a user may have to enter login information (e.g., username, password, security question answers) to obtain client-specific information regarding the digital assets via a web browser. For instance, in order to access information regarding software configurations, settings, or updates via a web browser, a cloud-based system may require a user to provide identifying information to allow the cloud-based system to authenticate the device and locate the client-specific information. Accordingly, although users are increasingly utilizing web applications to manage local digital assets, conventional systems make it difficult for users to seamlessly transition from the desktop to the web.

Some conventional systems reduce the inconvenience and frustration associated with using web applications to manage local digital assets by employing browser based plug-ins that identify computing devices (e.g., software applications that run in conjunction with a web browser that provide identifying information to the cloud-based system). Unfortunately, conventional systems that utilize plug-ins are subject to the individualized characteristics and operations of varying web browsers. For example, due to security issues, many browsers have recently discontinued support for NPAPI, a mechanism commonly utilized to build plug-ins for web browsers. Because web browsers are increasingly refusing to support third-party code, browser plug-ins fail to provide a reliable, global solution for securely identifying computing devices.

Similarly to browser-plugins, some conventional systems have utilized Flash local storage (i.e., Flash player) to pass domain-based cookies across a browser and identify computing devices. However, many web browsers have also discontinued support for Flash player due to security reasons. Accordingly, Flash local storage also fails to provide a reliable solution for identifying computing devices and coordinating web-based management systems with local applications.

These and other problems exist with regard to identifying computing devices via a web browser using conventional systems and methods.

BRIEF SUMMARY

Embodiments of the present disclosure provide benefits and/or solve one or more of the foregoing or other problems in the art with systems and methods that identify computing devices utilizing digital fonts. In particular, one or more embodiments of the disclosed systems and methods identify computing devices by utilizing customized digital fonts unique to the computing device. More specifically, in one or more embodiments, the disclosed systems and methods download a unique customized digital font to a computing device and subsequently utilize the customized digital font to identify the computing device.

For example, in one or more embodiments, the systems and methods generate a customized digital font and send the customized digital font to a computing device. Moreover, the systems and methods receive a request from a requesting device via a web browser. The systems and methods determine that the requesting device has the customized digital font and authenticate the requesting device based on the determination that the requesting device has the customized digital font.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
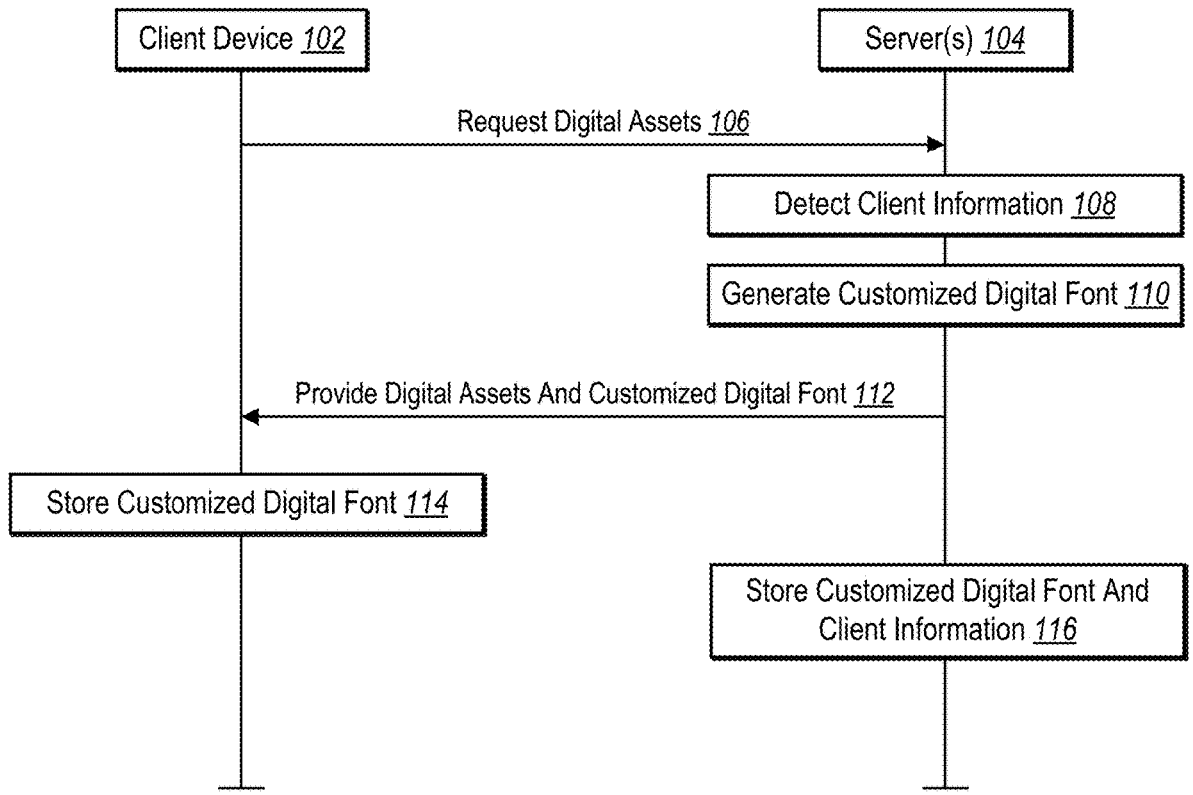
FIGS. 1A-1B illustrate sequence diagrams showing steps in a method of identifying a computing device in accordance with one or more embodiments.

One or more embodiments of the present disclosure include a digital identification system that utilizes customized digital fonts to identify computing devices. In particular, in one or more embodiments, the digital identification system generates a customized digital font specific to a particular computing device. In addition, the digital identification system utilizes the customized digital font to identify the particular computing device.

For example, in one or more embodiments, the digital identification system generates a customized digital font and sends the customized digital font to a computing device. The digital identification system then receives a request from a requesting device. The digital identification system can identify the requesting device (i.e., determine whether the requesting device is the computing device) based on whether the requesting device has the customized digital font. In particular, in one or more embodiments, the digital identification system determines that the requesting device has the customized digital font by obtaining an element from the requesting device to be rendered with the customized digital font. The digital identification system then authenticates the requesting device based on the determination that the requesting device has the customized digital font due to the element being rendered in the customized digital font.

More specifically, in one or more embodiments, the digital identification system generates a customized digital font by uniquely modifying a base digital font specific to a client device. The digital identifying system sends the customized digital font to the computing device (e.g., so the computing device can store the customized digital font in a digital font repository, such as a font folder, on the computing device). The digital identification system subsequently authenticates the computing device by determining that the computing device has the customized digital font. In particular, in one or more embodiments, the digital identification system sends a request to the computing device to render a reference text utilizing the customized digital font. The digital identification system analyzes the reference text rendered by the computing device to determine if the computing device rendered the reference text utilizing the customized digital font, and, based on the determination, identify/authenticate the computing device.

As just described, by utilizing a customized digital font, in one or more embodiments, the digital identification system securely identifies a computing device via a web browser without violating browser sandbox or security rules. Indeed, because browser security parameters permit a web browser to access and utilize digital fonts stored on a computing device, the digital identification system can utilize a customized digital font in conjunction with a web browser to securely authenticate the computing device without violating browser security settings.

In addition, by utilizing customized digital fonts, the digital identification system identifies computing devices without exchanging or exposing personal identification information. Indeed, the digital identification system generates customized digital fonts that do not reflect sensitive or personal information. Accordingly, exchanging and utilizing customized digital fonts preserves privacy and security of personal identification information while enabling systems and methods to securely authenticate a computing device.

Moreover, as mentioned, the digital identification system identifies a computing device without installing or deploying native code to a web browser. For instance, the digital identification system identifies a computing device without the need for installing web browser plug-ins. Accordingly, the digital identification system is not limited to the capabilities or security settings of a particular web browser, but provides a global solution for identifying computing devices communicating with third-party servers via a web browser. In other words, the digital identification system provides a non-browser-specific solution to identifying computing devices accessing a third-party website.

In addition, the digital identification system can automatically (e.g., without user input of login information) authenticate a computing device. Thus, the digital identification system can provide client information via a web browser without requiring the user to input identifying information. The digital identification system allows for a frictionless transition (e.g., a transition without the need for a user to enter login information) between local digital assets and related cloud-based digital assets.

As mentioned above, in one or more embodiments, the digital identification system identifies computing devices by generating a customized digital font. More particularly, the digital identification system generates a customized digital font by creating a base digital font and modifying the base digital font. For instance, in one or more embodiments, the digital identification system generates a base digital font comprising a plurality of characters in a particular order or position. The digital identification system then generates a customized digital font unique to a particular computing device by modifying the particular order or position of the characters within the base digital font.

As discussed above, the digital identification system utilizes the customized digital font to identify a computing device. For example, in one or more embodiments, the digital identification system creates a customized digital font and associates (e.g., via a database on a server) the customized digital font with client information particular to the computing device. The digital identification system also sends the customized digital font to the computing device. For example, the digital identification system can install and register the customized digital font on the computing device (e.g., to a digital font repository on the computing device) such that the customized digital font is available to local applications, such as a web browser. If the computing device later requests information via a web browser (e.g., requests information from a remote server via a web browser), the digital identification system can authenticate the computing device by determining whether the computing device has the customized digital font.

In one or more embodiments, the digital identification system determines that the computing device has the customized digital font by analyzing an element rendered by the computing device on a webpage. In particular, the digital identification system can send a request to a web browser on the computing device to render a textual element utilizing the customized digital font. The web browser renders the textual element. The digital identification system detects the textual element rendered by the web browser, and the digital identification system determines whether the web browser applied the customized digital font.

The digital identification system determines whether a web browser has rendered a textual element utilizing a customized digital font in a variety of ways. For example, in one or more embodiments, the digital identification system captures an image of a textual element rendered by a web browser and applies an optical character recognition ("OCR") algorithm to the captured image. Utilizing the OCR algorithm, the digital identification system identifies the characters of the textual element rendered by the computing device and determines whether the computing device rendered the textual element utilizing the customized digital font.

In addition to capturing an image and utilizing an OCR algorithm, in one or more embodiments, the digital identification system compares other characteristics of a rendered textual element. For example, in one or more embodiments, the digital identification system analyzes the width of a rendered textual element (e.g., compares the width of the textual element with a width of a second textual element) to determine whether the computing device has the customized digital font.

In one or more embodiments, the digital identification system generates and stores font-based identifications to assist in identifying a computing device. For example, in one or more embodiments, the digital identification system renders a textual element based on a reference text utilizing a customized digital font and stores the textual element as a font-based identification with regard to a particular client device. In other embodiments, the digital identification system generates a font-based identification that reflects variation between the base digital font and the customized digital font (e.g., converts characters of a customized digital font to a numerical representation of variation from the characters of the base digital font).

Regardless of form, however, the digital identification system utilizes a font-based identification to identify a client device. For example, in one or more embodiments, the digital identification system compares a font-based identification accessible to a server to a font-based identification generated from a computing device to assist in identifying the computing device.

To further ensure security and accuracy in identifying a computing device, one or more embodiments of the digital identification system obtains multiple font-based identifications from a computing device. For example, in one or more embodiments, the digital identification system obtains a font-based identification from a web browser associated with a client device. Moreover, upon receiving the font-based identification from the web browser, the digital identification system can also obtain a second font-based identification from a local digital asset (e.g., a software management application) on the computing device. The digital identification system can compare the font-based identification and the second font-based identification to further ensure that the client device has the customized digital font.

Furthermore, in one or more embodiments, the digital identification system also utilizes a device ID and/or checksum to further improve security and accuracy in identifying a computing device. For example, in one or more embodiments, upon receiving a font-based identification from a client device, the digital identification system obtains a device ID and/or a checksum from the client device. Utilizing the device ID and/or the checksum (in conjunction with the customized digital font) the digital identification system protects against transferring a customized digital font between computers and modifying a customized digital font to obtain unauthorized access to client information. Accordingly, the digital identification system can securely and accurately identify computing devices utilizing a customized digital font.

As mentioned previously, in one or more embodiments, the digital identification system identifies computing devices based on customized digital fonts. As used herein, the term "identify" (or "identifying") refers to recognizing a characteristic of a computing device. For example, the term "identify" includes determining a correlation between a computing device (e.g., a requesting device) and client information stored on a server associated with the computing device. Moreover, the term "identify" includes determining a correlation between a computing device (e.g., a requesting device) and a device ID, a font-based identification, or some other information uniquely distinguishing a computing device from other computing devices. In addition, the term "identify" includes determining that a client device has one or more digital assets (e.g., the computing device has installed a particular management software application). Similarly, the term "identify" includes determining state information regarding one or more digital assets (e.g., a version of a particular installed software application or updates available to the installed software application). The term "identify" also includes authenticating a computing device.

As used herein, the term "authenticate" (or "authenticating") refers to verifying that a computing device has one or more permissions. For instance, the term "authenticate" includes verifying that a computing device has permission to access a server, an application, or other digital assets. Similarly, the term "authenticate" includes verifying that a computing device has permission to access or receive client information stored on a server.

As used herein, the term "client information" refers to information regarding a computing device. The term "client information" also refers to information regarding one or more digital assets or users corresponding to a computing device. For example, the term "client information" includes a device ID or a font-based identification corresponding to a computing device. Moreover, the term "client information" includes information regarding a user of a computing device, such as personal identifying information (name, address, phone number, or other information), purchase information (e.g., purchase history or shopping cart contents), payment information (e.g., credit card information or payment preferences), user interests, or demographic information (e.g., age, gender, location, or ethnicity). In addition, "client information" can include access credentials or login credentials. Similarly, the term "client information" includes state information.

As used herein, the term "state information" refers to information regarding one or more digital assets installed on a computing device. For example, the term "state information" includes the number, type, title, size, capabilities, download date, or last updated date of digital assets installed on a client device. Similarly, the term "state information" includes one or more selections, configurations, or preferences with regard to a digital asset. Similarly, the term "state information" includes information regarding the version of digital assets installed on a client device. Moreover, the term "state information" includes information regarding available upgrades, patches, or improvements to a digital asset installed on a client device.

Additional details are now provided regarding the digital identification system in relation to illustrative figures portraying exemplary embodiments of the digital identification system. In particular, with regard to FIGS. 1A-1B additional detail is provided regarding steps utilized by the digital identification system to identify one or more computing devices utilizing customized digital fonts in accordance with one or more embodiments. Thereafter, with regard to FIG. 2 additional disclosure is provided regarding an exemplary user interface for providing client information upon authentication of a computing device. Moreover, disclosure with regard to FIGS. 3A-3C further illustrates how one or more embodiments of the digital identification system generate customized digital fonts and utilize customized digital fonts with regard to reference text. Furthermore, FIGS. 4A-4C and 5 disclose additional information regarding how the digital identification system analyzes rendered textual elements to determine whether computing devices have customized digital fonts in accordance with one or more embodiments. FIGS. 6, 7A-7E, and 8 provide additional specific details regarding steps and methods of identifying computing devices in accordance with one or more embodiments.

Figure 1B:
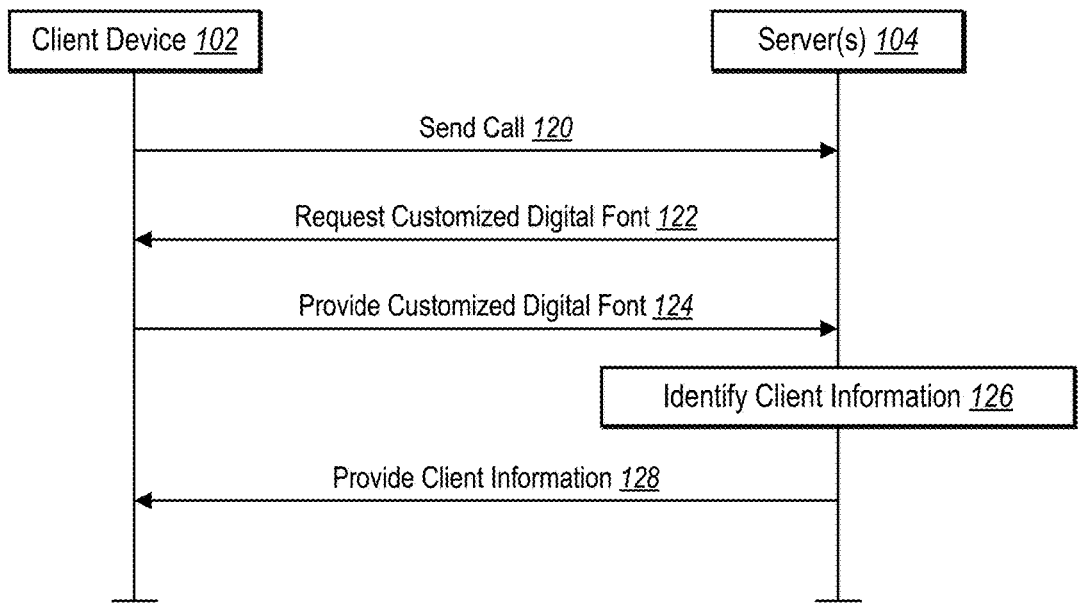

As mentioned, FIGS. 1A-1B illustrate a series of steps in one or more methods utilized by the digital identification system to identify a client device in accordance with one or more embodiments. It will be appreciated that the methods described in relation to FIGS. 1A-1B and other figures may be performed with less or more steps/acts or the steps/acts may be performed in differing orders. Additionally, the steps/acts described herein may be repeated or performed in parallel with one another or in parallel with different instances of the same or similar steps/acts.

FIG. 1A illustrates a method 100 of generating and providing a customized digital font. In particular, FIG. 1A illustrates a client device 102 and server(s) 104 performing a plurality of steps 106-116 in the method 100. In particular, with regard to step 106, FIG. 1A illustrates that the client device 102 requests digital assets from the server(s) 104. As used herein, the term "digital asset" refers to digital information installed on a server or computing device. The term "digital asset" includes one or more software applications installed or stored on a server or computing device. Thus, for example, a "digital asset" includes a software management application installed on a computing device. Similarly, a "digital asset" includes a photo-management software application, a photo-editing software application, or some other software application. In addition to software applications, the term "digital asset" also includes other electronic documents, data, or files installed on a client device. Thus, for example, the term "digital asset" can include a digital media file (e.g., music, video, or image file), word processing file, presentation file, database, or other file installed on a server or computing device.

The client device 102 can request any type or variety of digital assets. For example, in one embodiment, the client device 102 requests digital assets comprising a software management application capable of managing (e.g., monitoring, installing, uninstalling, updating, or providing notifications regarding) other software applications (e.g., ADOBE® CREATIVE CLOUD® software). Similarly, in one or more embodiments, the client device 102 requests some other type of software, such as digital photo editing software (e.g., such as ADOBE® PHOTOSHOP® software or ADOBE® ILLUSTRATOR® software). Moreover, in one or more embodiments, the client device 102 requests some other type of digital asset, such as one or more digital media files (e.g., music, video, or audio).

As shown in FIG. 1A, upon receiving the request for digital assets, the server(s) 104 perform the act 108 of detecting client information. The server(s) 104 can detect any type or variety of client information. For example, the client information can comprise a list of the digital assets requested by the client device at step 106. The client information can also comprise a device ID provided by the client device 102 or other information regarding the client device (e.g., location). Moreover, the client information can comprise information regarding an operator of the client device. For example, in conjunction with the request for digital assets (at step 106) the client device 102 can send login information and contact information to the server(s) 104 to login or otherwise authenticate with the server(s). The server(s) detect/authenticate such client information in step 108. In addition, the client information can include information regarding an account corresponding to the client device 102 (e.g., an account number or account name).

Although illustrated after the step 106 and before the step 110, it will be appreciated that the server(s) 104 can perform the step 108 of detecting client information at any time. For example, the server(s) 104 detects status information, payment information, purchase information, or other information corresponding to the client device 102 at any point in the method 100.

As illustrated in FIG. 1A, upon receiving a request for digital assets, the server(s) 104 performs the step 110 of generating a customized digital font. As mentioned above, in one or more embodiments, the server(s) 104 generate a customized digital font utilizing a base digital font. For example, the server(s) 104 receives, identifies, or generates a base digital font and then modify the base digital font to generate a customized digital font particular to the client device 102.

As used herein, the term "base digital font" refers to a defined set of digital characters. In particular, the term "base digital font" includes a collection of digital characters utilized to create a customized digital font (e.g., a customized digital font reflects a modified base digital font). A base digital font includes digital files with one of the following, or other, extensions: .ttf, .otf, .fnt, .abf, .ttc, .suit, .woff, .vnf, .t65, .sfp, .sfd, .pmt, .pfm, .pfb, .pfa, .odtff, .mf, .gdr, .fon, .fnt, .etx, .eot, .compositefont, .acfm, .afm, or .amfm. A base digital font can comprise a standard set of characters of one particular style, such as Helvetica, Times New Roman, Arial, etc. A base digital font can also comprise a non-standardized set of digital character. For example, in one or more embodiments, the digital identification system generates a non-standard base digital font utilizing a combination of alpha-numeric characters, icons, and/or image characters.

As used herein, the term "customized digital font" refers to a modified set of digital characters. In particular, the term "customized digital font" includes a modified set of digital characters capable of display via a computing device. For instance, the term "customized digital font" includes a set of digital characters created by modifying a base digital font. For example, the term "customized digital font" includes a unique set of digital characters specific to a particular computing device. Similarly, the term "customized digital font" can include a set of digital characters specific to a digital asset. A customized digital font can comprise any type or kind of digital characters, including alpha-numeric characters, icons, or image characters (e.g., emoji). For example, a customized digital font includes files with the one of the following, or other, extensions: .ttf, .otf, .fnt, .abf, .ttc, .suit, .woff, .vnf, .t65, .sfp, .sfd, .pmt, .pfm, .pfb, .pfa, .odtff, .mf, .gdr, .fon, .fnt, .etx, .eot, .compositefont, .acfm, .afm, or .amfm. In one or more embodiments, a customized digital font can be utilized with a web browser to render a textual element on a webpage.

More specifically, in one or more embodiments, the server(s) 104 generate a base digital font with a plurality of characters (e.g., alpha-numeric characters or icons) in a first order. The server(s) generates the customized digital font by modifying the order of the plurality of characters. For example, the server(s) 104 generates a customized digital font by swapping the position of a first character and the position of a last character of a base digital font to create customized digital font comprising a second order of digital characters from the base digital font. Moreover, in one or more embodiments, the server(s) can give a name to the customized digital font (i.e., AdobeCustomFont).

In addition to modifying an order of digital characters, it will be appreciated that the digital identification system can modify a base digital font in a variety of other ways to generate a customized digital font. For example, in one or more embodiments, the digital identification system modifies the orientation (e.g., rotation of characters) of a base digital font. In yet other embodiments, the digital identification system modifies other characteristics of the base digital font, such as width, height, curvature, style, or other characteristics. In still further embodiments, the digital identification system modifies the characters that comprise the customized digital font.

The digital identification system can generate different customized digital fonts based on a variety of factors. For example, as discussed, the digital identification system generates a customized digital font unique to a particular device. The digital identification system can also create customized digital fonts particular to a unique digital asset. For example, the digital identification system creates a first customized digital font with regard to a first digital asset installed on a client device and create a second customized digital font with regard to a second digital asset. Similarly, in one or more embodiments, the digital identification system creates customized digital fonts unique to a particular user.

As shown in FIG. 1A, upon generating a customized digital font, the server(s) 104 perform the step 112 of providing the digital assets and the customized digital font to the client device 102. Upon receiving the customized digital font, the client device 102 stores the customized digital font in step 114.

The digital identification system can provide a customized digital font to the client device 102 in a variety of ways. For example, a software management application installed on the client device (at step 112) can register and store the customized digital font within a generalized font repository of the client device 102 (e.g., save the customized digital font as "AdobeCustomFont" in a font folder). In other embodiments, the server(s) 104 provides the customized digital font to the client device 102 and direct a location (e.g., a font repository) to save the customized digital font.

Alternatively, the digital identification system provides the customized digital font to the client device 102 in a manner that causes the client device 102 to not permanently store the customized digital font on the client device 102. For example, in one or more embodiments, the digital identification system reduces the risk of a user or client device modifying a customized digital font by loading the customized digital font in memory on the client device 102 only when a particular digital asset (e.g., a software management application) is running on the client device 102. For example, the digital identification system can load the customized digital font when a software management application is running and unload the customized digital font when the software management application is no longer running. Similarly, in some embodiments, the digital notification temporarily saves the customized digital font into a repository of fonts (e.g., when a local software management application is running) and later removes the customized digital font from the repository of fonts (e.g., when the local software management application is not running).

In addition, as shown in FIG. 1A, the server(s) 104 stores the customized digital font and client information in step 116. In particular, in one or more embodiments, the server(s) 104 map the customized digital font and client information to an account corresponding to the client device 102. Specifically, in one or more embodiments the server(s) 104 map a customized digital font and client information in a database, such that the digital identification system can locate and recall the client information based on the customized digital font (and vice versa).

The server(s) 104 can store the customized digital font in a variety of forms. For example, in one or more embodiments, the server(s) 104 store a font file. In other embodiments, the server(s) generate a font-based identification. As used herein, the term "font-based identification" refers to a digital element created based on a customized digital font. In particular, the term "font-based identification" includes a digital element created based on a customized digital font that is utilized to identify a computing device. A font-based identification can take a variety of forms, including text (e.g., a reference text rendered utilizing a customized digital font), images, or a unique identifier ("UID").

In one or more embodiments the digital identification system identifies a reference text (e.g., a pre-defined textual string) and renders the reference text utilizing the customized digital font. The server stores the reference text rendered utilizing the customized digital font as a font-based identification (e.g., as text, as an image, or in some other format). For example, as explained in greater detail below with regard to FIGS. 3A-3C, in one or more embodiments, the digital identification system generates a font-based identification that reflects a measure of variation between the base digital font and the customized digital font (e.g., a variation between the reference text in the base digital font and the reference text in the customized digital font).

Although FIG. 1A illustrates the server(s) 104 performing the step 116 of storing customized digital font and client information, it will be appreciated that the client device 102 can interact with the server(s) with regard to step 116. For example, in one or more embodiments, the client device 102 renders a textual element of a reference text utilizing the customized digital font.

As used herein, the term "render" (or "rendering") refers to creating a digital element. For instance, the term "render" includes creating a digital element (e.g., a textual element) as part of a webpage. Similarly, the term "render" includes creating a digital image. The term "render" includes creating digital elements that are both visible and invisible (e.g., hidden). Thus, for example, the digital identification system can render a digital element (e.g., textual element) as part of a webpage, even though the digital element is not visible to a user of the webpage. Specifically, in one or more embodiments, the digital identification system renders a hidden textual element on the canvas of a webpage.

As used herein, the term "textual element" refers to a digital element comprising one or more characters. The term "textual element" includes text rendered on a canvas of a webpage. Similarly, the term "textual element" includes text represented in a digital image. A textual element can include any type of character and can be rendered utilizing a variety of fonts. For example, in one or more embodiments, the digital identification system renders a textual element comprising a reference text utilizing a customized digital font.

Moreover, the client device 102 sends the textual element to the server(s) 104. Thereafter, the server(s) 104 stores the textual element as a font-based identification (or modify the textual element of the reference text to generate a font-based identification).

It will be appreciated that although FIG. 1A illustrates a single client device 102, the digital identification system and the server(s) 104 can perform the steps 106-116 with regard to a plurality of client devices. Thus, the server(s) 104 can detect client information, generate customized digital fonts, and store customized digital fonts and client information with regard to a plurality of client devices. In this manner, the digital identification server (via the server(s) 104) can manage customized digital fonts corresponding to a plurality of computing devices.

As mentioned previously, in addition to storing a customized digital font and client information corresponding to client devices, the digital identification system can utilize the customized digital fonts to identify the client devices. For example, FIG. 1B illustrates additional steps in the method 100 for utilizing a customized digital font to identify a client device. In particular, FIG. 1B illustrates the client device 102 and the server(s) 104 performing steps 120-128.

For example, FIG. 1B illustrates the step 120 of the client device 102 sending a call to the server(s) 104. In one or more embodiments, the step 120 comprises a call from the client device 102 to the server(s) 104 requesting a webpage hosted by the server(s) 104. For example, the client device 102 utilizes a web browser to navigate to a website (e.g., adobe.com) and request a webpage from one or more servers corresponding to the website. In addition to a call for a webpage, the step 120 can include a variety of other calls from the client device 102 to the server(s) 104. For example, the client device 102 can send a call via a web browser requesting client information from the server(s) 104.

For instance, in one or more embodiments, the client device 102 downloads one or more digital assets from a web site associated with the server(s) 104 (as described with regard to FIG. 1A). Thereafter, the client device 102 returns to the web site associated with the server(s) 104 and performs the step 120. For example, the client device 102 can return to the web site via a web browser to manage one or more downloaded digital assets, to review client information, or to search for additional digital assets. In doing so, the client device 102 can send a call to the server(s) to request a web page, manage digital assets, request client information, request additional digital assets, etc. The digital identification system can receive the call, and, as described below, automatically authenticate the client device 102.

In particular, as shown in FIG. 1B, upon receiving a call from the client device 102, the server(s) 104 performs the step 122 of requesting the customized digital font from the client device 102. The server(s) 104 request the customized digital font in a variety of ways. In one or more embodiments, the server(s) 104 sends a webpage (e.g., web content with HTML instructions) to the client device 102 (e.g., via a web browser). In particular, in one or more embodiments, the server(s) 104 send a webpage that includes instructions to render an element that uses the customized digital font. Specifically, in one or more embodiments, the server(s) 104 send webpage source code that includes a textual element (e.g., a textual element that comprises a reference text) that utilizes the customized digital font. By sending the webpage with the textual element that utilizes the customized digital font to the client device 102, the server(s) 104 request the customized digital font from the client device 102 (e.g., request the client device 102 to render the textual element utilizing the customized digital font).

Specifically, in one or more embodiments, the server(s) 104 create a customized digital font with a title (e.g., "AdobeCustomFonts," which can be a uniform title applied to a plurality of customized digital fonts). The server(s) can send a webpage with HTML instructions to render a textual element utilizing a font comprising the title (e.g., instructions to render a textual element utilizing "AdobeCustomFonts").

In other embodiments, the server(s) 104 can request the customized digital font in other ways. For example, in one or more embodiments, the server(s) 104 requests a font file that matches a title of a customized digital font. In other embodiments, the server(s) 104 send a query regarding the customized digital font to the client device 102.

As shown in FIG. 1B, upon receiving a request for the customized digital font, the client device 102 performs the step 124 of providing the customized digital font to the server(s) 104. For example, in one or more embodiments, the client device 102 renders a webpage that contains an element requested by the server(s) 104. In particular, the client device 102 utilizes a web browser to generate a webpage comprising a textual element (e.g., a textual element based on a reference text) that utilizes the customized digital font. More specifically, the client device 102 utilizes a web browser to render a textual element on a canvas of the web page utilizing the customized digital font.

In other embodiments, the client device 102 provides the customized digital font in other ways (i.e., other than rendering an element on a webpage). For example, the client device 102 utilizes a local digital asset (e.g., a digital asset other than a web browser) to render a textual element utilizing the customized digital font. Specifically, the client device 102 can render a textual element utilizing the customized digital font utilizing a software management application and send the textual element via the software management application. Similarly, the client device 102 sends a font file to the server(s) 104. Moreover, the client device 102 can respond to a query regarding whether the customized digital font is on the client device 102.

In one or more embodiments, the server(s) 104 capture an image of the textual element rendered on the webpage by the client device 102. In particular, the server(s) 104 analyze the webpage, identify the textual element rendered by the client device 102, and capture an image of the element rendered by the client device 102.

In such embodiments, the server(s) 104 analyzes an image of the element rendered by the client device 102 to determine whether the element was rendered utilizing the customized digital font. For example, in one or more embodiments, the server(s) 104 apply an OCR algorithm to the captured image reflecting the textual element rendered by the client device 102. By applying an OCR algorithm, the server(s) 104 identifies the characters rendered by the client device 102. Moreover, the server(s) 104 analyzes the characters to determine whether the client device utilized the customized digital font.

In this manner, the server(s) 104 detects whether the client device 102 has the customized digital font. For example, if the client device 102 did not have the customized digital font, the client device 102 would not be able to utilize the customized digital font to render a textual element in request to a response from the server(s) 104. Rather, the client device 102 would render the element utilizing a fallback or default font (such as Times New Roman, Arial, etc.). In such a circumstance, the server(s) 104 analyze the characters of the rendered textual element and determine that the characters do not correspond to the customized digital element.

The server(s) 104 analyze an element rendered by the client device 102 in a variety of ways to determine whether the client device 102 has the customized digital font. For example, in one or more embodiments, the server(s) 104 determine that the client device 102 has the customized digital font by comparing one or more characteristics of an element rendered by the client device 102 to an expected element. More specifically, the server(s) 104 compares the width of a textual element comprising a reference text rendered by the client device 102 and the expected width of a textual element of the reference text rendered utilizing the customized digital font. In this manner, the server(s) 104 determines whether the client device 102 has the customized digital font.

For example, the digital identification system compares the width (or other characteristics) of a rendered textual element to determine whether the client device 102 has a digital asset. Indeed, to determine whether the client device 102 has a digital asset, the digital identification system does not necessarily need to uniquely identify the precise characters of a reference text rendered utilizing the customized digital font. Rather, by comparing the width (or other characteristics) of a textual element the digital identification system can determine that a textual element corresponds generally to a customized digital font, and therefore, the client device 102 also has one or more digital assets. Because comparing width (or other characteristics) does not require use of an OCR algorithm or other analysis techniques, the digital identification system can identify that the client device 102 has downloaded a digital asset while reducing the time and computation resources required to identify the client device 102.

In other embodiments, the server(s) 104 determine that the client device 102 has the customized digital font by analyzing the characters of a textual element. For example, in one or more embodiments, the server(s) 104 identify a textual element comprising a reference text rendered by the client device 102 and compare the characters of the textual element rendered by the client device 102 with characters of reference text rendered utilizing the customized digital font. In particular, the server(s) 104 utilize the customized digital font to render a reference text and compare the characters of the reference text rendered by the server(s) 104 with the characters of the reference text rendered by the client device 102. In this manner, the server(s) 104 verify that the client device 102 has the customized digital font.

In one or more embodiments, the digital identification system specifies the fallback fonts in a web browser. Thus, for example, the digital identification system creates a text string with the generic fallback fonts (e.g., Calibri, Arial, and Times) and notes the width of the text string. The digital identification system compares the width of a rendered text element with the width of the text string generated with the generic fonts. If the width of the rendered text element corresponds to the width of the text strings generated with the generic fonts, the digital identification system determines that the client device 102 does not have the customized digital font (but rather, the client device 102 utilized a fallback font to generate the textual element).

As illustrated in FIG. 1B, upon the client device 102 providing the customized digital font, the server(s) 104 perform the step 126 of identifying client information. In particular, the client device 102 utilizes the customized digital font provided by the client device 102 to identify the client information corresponding to the client device and stored at the server(s) 104 at step 116. In particular, in one or more embodiments, upon receiving the customized digital font from the client device 102 (i.e., determining that the client device 102 has the customized digital font), the server(s) utilize the customized digital font to locate client information from one or more databases. For example, the server(s) utilize the customized digital font as a font-based identification (or generate a font-based identification) to search for and identify client information stored at the server(s) 104.

For example, as discussed above, in one or more embodiments, the digital identification system, retrieves a rendered textual element based on a reference text from the client device 102. The server(s) 104 utilize the rendered textual element as a font-based identification to identify client information corresponding to the client device in a database (e.g., identify an account corresponding to the client device 102 and the client information). In this manner, the digital identification system identifies a client device. Indeed, upon determining that the client device 102 has the customized digital font, the digital identification system can authorize the client device 102 to access client information stored on the server(s) 104.

For instance, as shown in FIG. 1B, upon determining that the client device 102 has the customized digital font (and upon identifying client information corresponding to the client device 102), in one or more embodiments, the server (s) 104 perform the step 128 of providing client information to the client device 102. For example, the server(s) 104 provide state information such as upgrades or updates available for digital assets installed on the client device 102. Similarly, the server(s) can provide personalized information (e.g., a greeting utilizing a name of the user of the client device 102), purchase information (e.g., a purchase history), or any other client information.

In one or more embodiments, the server(s) 104 provide access credentials. As used herein, the term "access credentials" refers to data that enables a user, client device, or application to access servers, digital files, data, accounts, features, or capabilities. For instance, "access credentials" includes data that enables a computing device to access a remote server or website. Similarly, "access credentials" includes data that enables client device to access capabilities or features of an application. For example, "access credentials" includes an access token that permits a client device to access a server (e.g., to access client information). Similarly, the term "access credentials" includes login credentials. As used herein, the term "login credentials" refers to data reflecting user input of data that enables access to servers, digital files, data accounts, features, or capabilities. For example, "login credentials" would include data reflecting user input of a username and/or password (e.g., sign on information that enables access to a website or software).

Upon determining that client device has the customized digital font, the server(s) 104 can obtain an access token with regard to a server storing the client information. The server(s) 104 can utilize the access token to provide the client information to the client device 102 (e.g., provide the access token to the client device or utilize the access token to access client information and provide the client information to the client device 102). Notably, the server(s) 104 provide access credentials and other client information to the client device without requiring a user of the client device 102 to input login information. Accordingly, the client device 102 can navigate to a website utilizing a web browser and automatically obtain secure client information.

Figure 2:
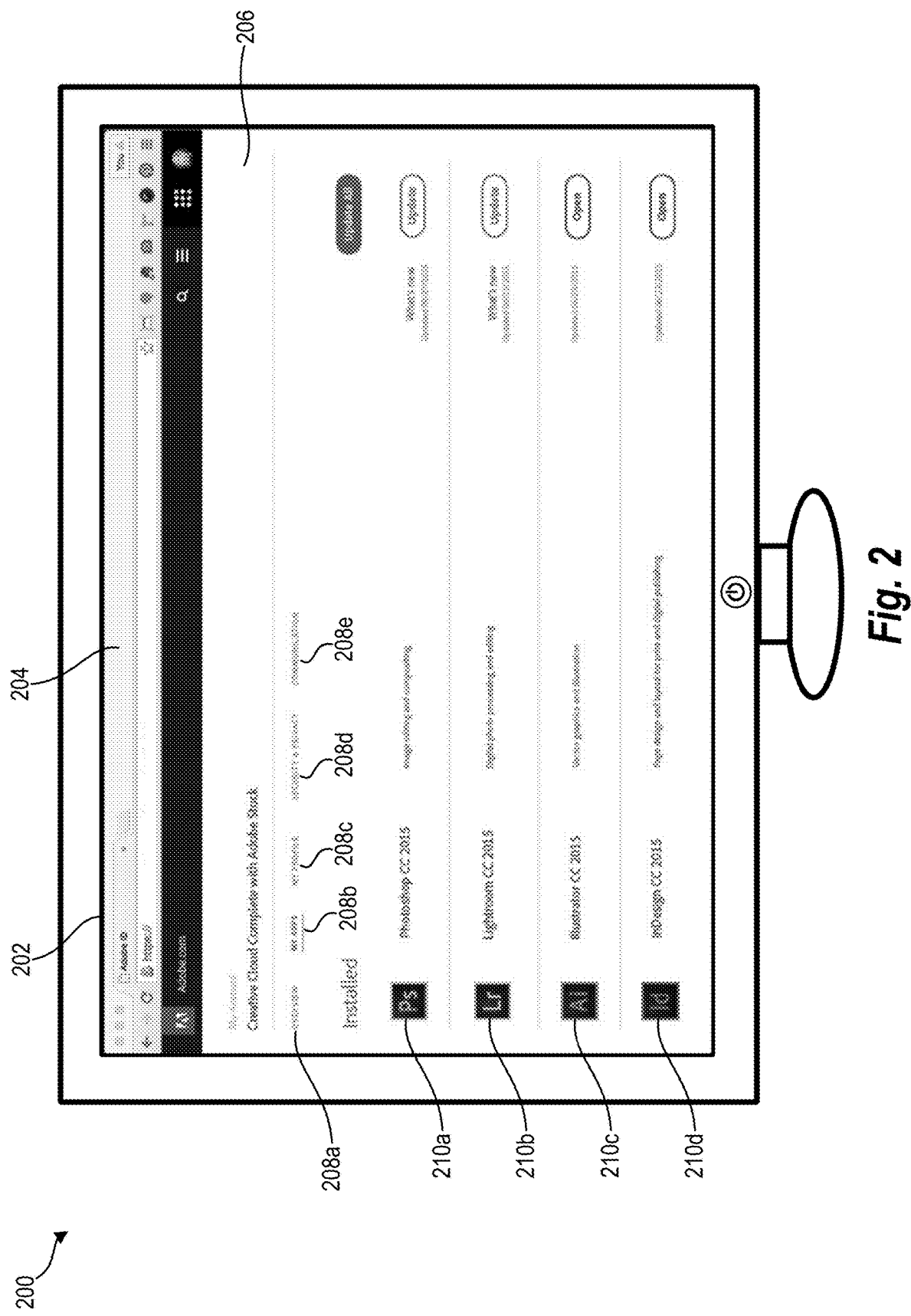
FIG. 2 illustrates a web browser with a user interface providing client information upon identifying a computing device in accordance with one or more embodiments.

For example, FIG. 2 illustrates a computing device 200 with a screen 202 illustrating a user interface 206 of a web browser 204 installed on the computing device 200 in accordance with one or more embodiments. The computing device 200 has previously downloaded digital assets from a website (e.g., downloaded ADOBE® CREATIVE CLOUD® software, ADOBE® PHOTOSHOP® software, ADOBE® LIGHTROOM® software, ADOBE® ILLUSTRATOR® software, or ADOBE® INDESIGN® software from adobe.com) and, the process, received a customized digital font. As illustrated in FIG. 2, the web browser 204 subsequently navigates to the website (e.g., adobe.com).

As shown, upon navigating to the website, the digital identification system automatically provides client information (without user input of login information) to the computing device 200. Specifically, as just described with regard to FIGS. 1A-1B, the digital identification system determines that the computing device 200 has a customized digital font, and utilizes the customized digital font to identify (e.g., authenticate) the computing device 200. Accordingly, the digital identification system provides client information to the computing device 200 and the computing device 200 provides the client information for display.

In particular, the user interface 206 of the web browser 204 displays a plurality of client information selectable options 208a-208e. Upon user interaction with the client information selectable options 208a-208e the user interface 206 provides different client information for display.

For example, as shown in FIG. 2, the client information selectable option 208b (entitled "MY APPS") is currently active, and the user interface 206 displays a plurality of digital assets installed on the client device. Specifically, the user interface 206 displays status information regarding a plurality of digital assets 210a-210d. For instance, with regard to digital asset 210a, the user interface 206 displays a title of the digital asset installed on the computing device 200 (i.e., "Photoshop CC 2015"), a description of the digital asset installed on the computing device 200 (i.e., "Image editing and compositing"), a selectable element for additional information on new features of the digital asset installed on the computing device 200 (i.e., "What's new"), update information with regard to the digital asset installed on the computing device 200 (i.e., "Updated Sep. 27, 2015"), and a selectable element for installing an update to the digital asset installed on the computing device 200 (i.e., "Update" element).

The user interface 206 can also provide additional client information for display. For example, upon user selection of the client information selectable option 208c (entitled "MY PROFILE") the user interface 206 can display information regarding a profile associated with the computing device 200 and/or a user of the computing device 200. In particular, the user interface 206 can display contact information, purchase history, payment information, or other client information. Similarly, upon user selection of the client information selectable option 208d, entitled "SECURITY & PRIVACY," the user interface 206 can display client information comprising security and privacy settings corresponding to the computing device 200.

Accordingly, as shown in FIG. 2, utilizing a customized digital font, the digital identification system authorizes the computing device 200 and provides client information to the computing device 200. Significantly, the digital identification system automatically provides the client information to the computing device 200 in response to the computing device 200 navigating to a website (or providing some other call to a server). In this manner, the digital identification system enables users to seamlessly transition between local and server-based digital assets.

Figure 3A:
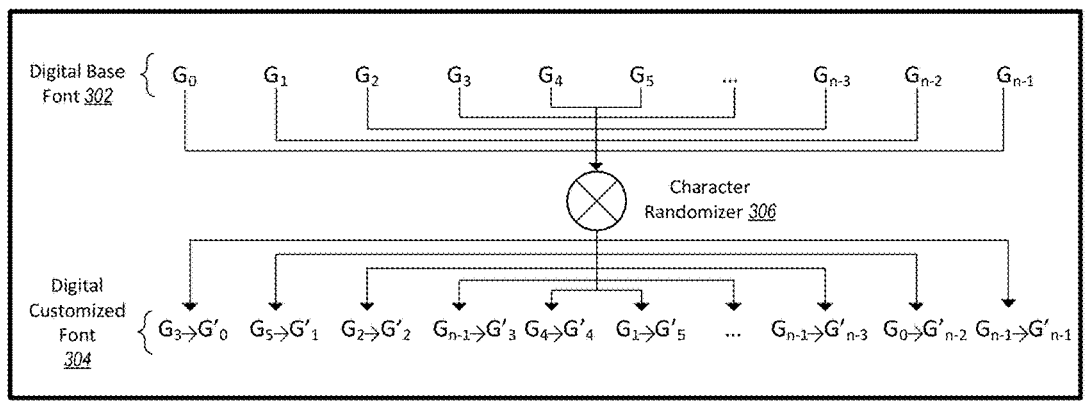
FIG. 3A illustrates a representation of generating a customized digital font in accordance with one or more embodiments.
Figure 3B:
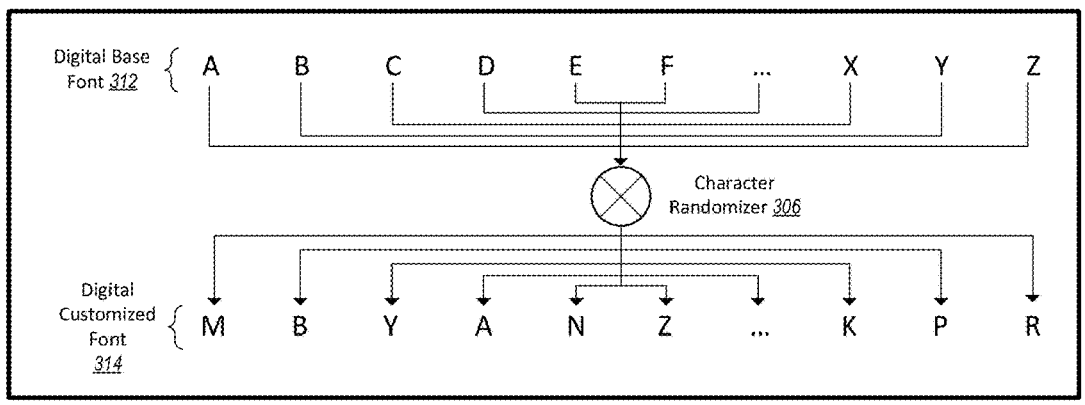
FIG. 3B illustrates another representation of generating a customized digital font in accordance with one or more embodiments.
Figure 3C:
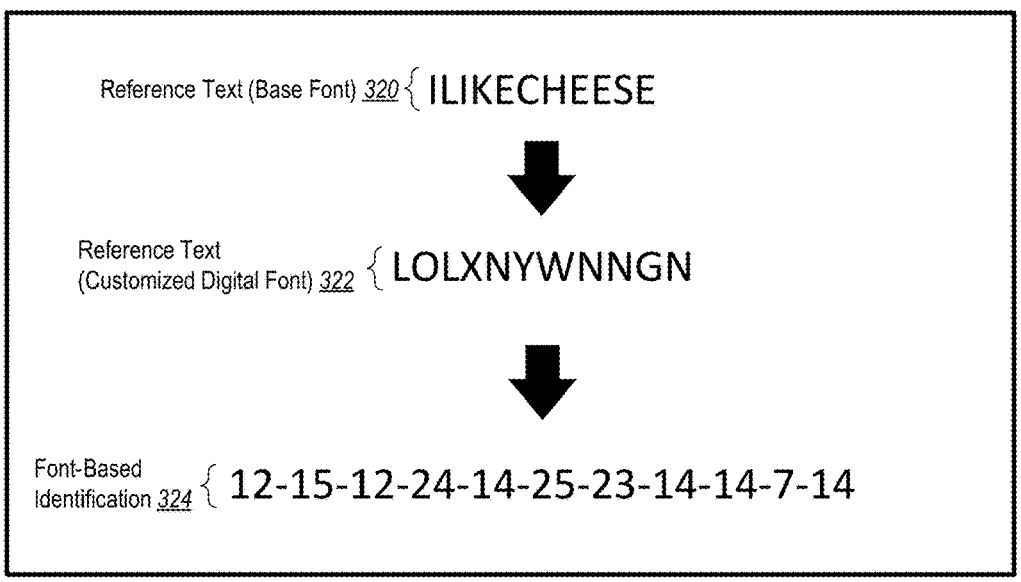
FIG. 3C illustrates a representation of converting a reference text from a base digital font into a reference text in a customized digital font and a font-based identification in accordance with one or more embodiments.

Turning now to FIGS. 3A-3C, additional detail will be provided regarding generating a customized digital font and utilizing a customized digital font in conjunction with a reference text in accordance with one or more embodiments. In particular, FIG. 3A illustrates a representation of generating a customized digital font in accordance with one or more embodiments. Specifically, FIG. 3A illustrates a base digital font 302, comprising n characters: $G_0$ through $G_{n-1}$. As mentioned above, the digital identification system can receive, identify, or generate the base digital font 302. For example, in one or more embodiments, the base digital font 302 is a standardized font with standardized characters. The digital identification system can utilize a standardized font, such as Times New Roman, as the base digital font.

In other embodiments, the digital identification system generates the base digital font 302 (e.g., generates a non-standard font). For example, the digital identification system generates the base digital font 302 from a plurality of icons (e.g., a smiley face, star, circle, or square). Similarly, the digital identification system can generate the base digital font 302 by modifying the type, size, style, order, orientation, or spacing of existing fonts or existing individual alpha-numeric characters.

The base digital font 302 can be any number of characters. For example, in one or more embodiments, the base digital font 302 comprises twenty-six characters (e.g., one character for each letter of the English alphabet). In other embodiments, the base digital font 302 comprises a different number of characters, for example, ten (e.g., base ten numeric characters), fifty-two (upper case and lower case English alphabet characters), sixty-two (upper case, lower case, and numeric characters) or some other number or type of characters (e.g., kanji, emoji, special characters, icons, or any other characters).

As illustrated in FIG. 3A, however, in one or more embodiments, the digital identification system modifies the base digital font to generate a customized digital font 304. The digital identification system can modify the base digital font in a variety of ways to generate a customized digital font. For example, the digital identification system can modify the position or order of characters, the character type, the character style, the character spacing, the character orientation (i.e., rotation), the character height, the character width, or some other characteristic.

With regard to the embodiment of FIG. 3A, the digital identification system modifies the base digital font 302 by randomly swapping the position of characters from the base digital font 302 to generate the customized digital font 304. As shown, the digital identification system utilizes a character randomizer 306 to modify the characters $G_0$ through $G_{n-1}$ from the base digital font to characters $G'_0$ through $G'_{n-1}$ in the customized digital font 304. Thus, for example, the character randomizer 306 generates the customized digital font by assigning the character $G_3$ from the base digital font to the character $G'_0$ in the customized digital font. Similarly, as shown, the character randomizer 306 assigns the character $G_5$ from the base digital font to the character $G'_1$ in the customized digital font 304. In this manner, the digital identification system generates the customized digital font 304 from the base digital font 302.

As explained, the digital identification system can utilize any base digital font to generate a customized digital font. For example, FIG. 3B illustrates utilizing a standard digital font to generate a customized digital font in accordance with one or more embodiments. In particular, FIG. 3A illustrates a base digital font 312 comprising characters A through Z. The character randomizer 306 can modify the base digital font 312 to generate the customized digital font 314. In particular, the character randomizer 306 replaces the letter "A" position from the base digital font with the letter "M" in the customized digital font. Similarly, the character randomizer 306 replaces the letter "C" position in the base digital font with the letter "Y" in the customized digital font. Accordingly, the digital identification system utilizes the character randomizer 306 to modify the position of the characters in the base digital font 312 to generate the customized digital font 314.

As described previously, the digital identification system can also utilize a customized digital font with regard to one or more reference texts. As used herein, the term "reference text" refers to a pre-defined text. In particular, the term "reference text" includes a pre-defined textual string utilized to identify a computing device. For example, the term "reference text" includes a pre-defined textual string that can be compared to other textual elements to identify a computing device.

For example, the digital identification system applies a customized digital font to a reference text in a base digital font. In particular, FIG. 3C illustrates a reference text 320 rendered utilizing the base digital font 312 (i.e., "ILIKE-CHEESE"). As shown in FIG. 3C, the digital identification system applies the customized digital font to the reference text resulting in a reference text 322 reflecting the customized digital font 314 (i.e., "LOLXNYWNNGN").

As described above, in one or more embodiments, the digital identification system utilizes the reference text 322 based on the customized digital font 314 as a font-based identification. For example, the server(s) 104 can associate the reference text 322 based on the customized digital font 314 with client information stored on the server(s) 104 and utilize the reference text 322 to authenticate a client device.

In one or more embodiments, the digital identification system further modifies the reference text 322 reflecting the customized digital font 314 to generate another font-based identification, such as a unique identifier. In particular, as shown in FIG. 3C, the digital identification system can generate a font-based identification 324 based on the variation between the customized reference text 322 reflecting the customized digital font 314 and the base digital font 312. Specifically, with regard to the embodiment of FIG. 3C, the digital identification system can determine that the letter "L" in the reference text 322 is the twelfth character in the base digital font 312 (i.e., the twelfth letter of the alphabet). Accordingly, the digital identification system can replace the letter "L" from the reference text 322 with the number "12" in the font-based identification 324.

Similarly, the digital identification system can determine that the letter "0" in the reference text 322 is the fifteenth character in the base digital font 312 (i.e., the fifteenth letter of the alphabet). Accordingly, the digital identification system replaces the letter "0" from the reference text 322 with the number "15" in the font-based identification 324. As shown in FIG. 3C, the digital identification system applies a similar transformation for each character in the customized digital font reference text, generating the font-based identification 324 (i.e., "12-15-12-24-14-25-23-14-14-7-14").

Although FIG. 3C illustrates a font-based identification based on a particular base digital font and a particular variation calculation, it will be appreciated that the digital identification system can utilize a variety of alternative base fonts and approaches to generating a font-based identification. For example, rather than utilizing letters, the base digital font 312 can comprise a plurality of icons. It will be appreciated that the digital identification system can transform a reference text comprising icons (or any other characters) to the font-based identification 324.

Furthermore, although the embodiment of the digital identification system reflected in FIG. 3C transforms the letter "L" to the number "12" (because the letter "L" is the twelfth character in the base digital font 312), the digital identification system can transform the letter "L" to a variety of other numbers or characters. For example, the digital identification system can transform the letter "L" to the number "4" (because the letter "L" in the reference text 322 is four characters removed from the base digital font letter "I," the first letter in the reference text 320, "ILIKECHEESE").

Similarly, although FIG. 3C illustrates the font-based identification 324 as a base-ten numeric figure, it will be appreciated that the font-based identification 324 can reflect a different figure or base system. For example, in one or more embodiments, the font-based identification 324 comprises a binary value. Similarly, in other embodiments, the font-based identification is stored as hexadecimal value.

Figure 4A:
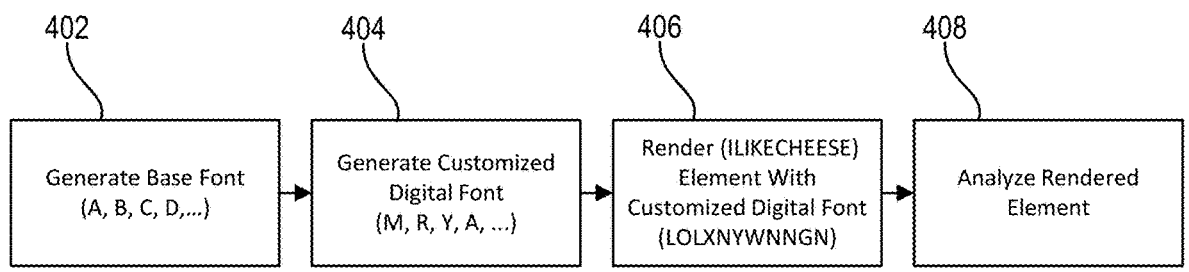
FIG. 4A illustrates a sequence diagram showing steps in a method of identifying a computing device in accordance with one or more embodiments.
Figure 4B:
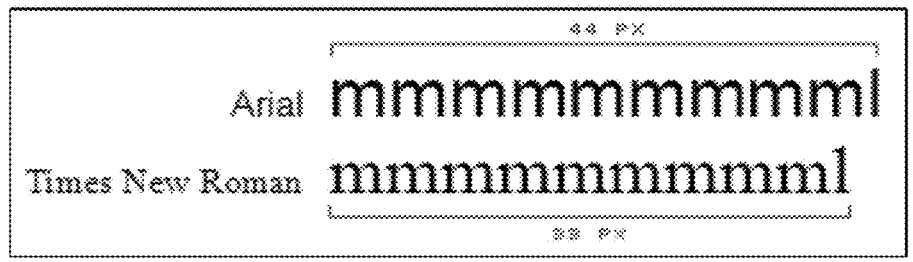
FIG. 4B illustrates a representation of analyzing a textual element to identify a computing device in accordance with one or more embodiments.
Figure 4C:
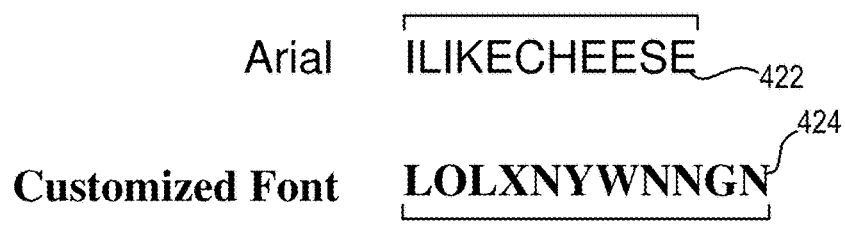
FIG. 4C illustrates a representation of comparing textual elements in accordance with one or more embodiments.

Turning now to FIGS. 4A-4C, additional detail will be provided regarding generating and analyzing a textual element to determine that a client device has a customized digital font in accordance with one or more embodiments. In particular, FIG. 4A illustrates a sequence diagram of steps in a method of identifying a client device in accordance with one or more embodiments. As illustrated, at step 402 the digital identification system generates a base digital font (e.g., the base digital font 312). Moreover, as just discussed, at step 404, the digital identification system generates a customized digital font (e.g., the customized digital font 314).

At step 406, the digital identification system renders an element with a customized digital font. For example, the digital identification system renders a textual element based on a reference text (i.e., "ILIKECHEESE") as part of rendering a web page (or utilizing another local digital asset). Specifically, at step 406 the digital identification system renders a text element based on a reference text utilizing a customized digital font (e.g., renders a textual element utilizing the reference text 322, "LOLXNYWNNGN").

At step 408, the digital identification system analyzes the rendered element. In particular, the digital identification system analyzes one or more characteristics of the textual element rendered at step 406. For example, in one or more embodiments, the digital identification system analyzes the width (or some other characteristics) of the textual element rendered at step 406.

It will be appreciated that the width of text varies from font to font. For example, FIG. 4B illustrates the same text rendered utilizing two different fonts (i.e., Arial and Times New Roman). As illustrated, the width of the text rendered utilizing Arial font is 44 pixels wide and the width of the text rendered utilizing Times new Roman is 33 pixels wide. The digital identification system detects the width of text and utilizes the width to determine whether the text was rendered in a customized digital font.

In particular, in one or more embodiments, the digital identification system compares the width of a textual element rendered by a client device with an expected width of a textual element rendered utilizing the customized digital font. For example, FIG. 4C illustrates a first textual element 422 comprising a reference text rendered in a first font (i.e., Arial) and a second textual element 424 comprising the same reference text rendered in a customized digital font (i.e., rendered utilizing the customized digital font 314). As shown, the width of the first textual element 422 differs from the second textual element 424.

The digital identification system can detect and compare the width of the first textual element 422 and the width of the second textual element 424. For example, the digital identification system identifies the width of the first textual element 422 from a webpage (e.g., a client device can utilize a web browser to render the first textual element 422 as part of a webpage). Moreover, the digital identification system can compare the width of the first textual element 422 with the width of the second textual element 424 (i.e., an expected width of the reference text rendered utilizing a customized digital font). Based on the comparison, the digital identification system determines whether or not the first textual element 422 was rendered utilizing the customized digital font.

For example, if the width of the first textual element 422 corresponds to the width of the second textual element 424, the digital identification system can determine that the first textual element 422 was rendered utilizing the customized digital font. Similarly, if the width of the first textual element 422 does not correspond to the width of the second textual element 424, the digital identification system can determine that the first textual element 422 was rendered utilizing a font other than the customized digital font.

Rather than comparing a textual element to a reference text mapped utilizing the customized digital font, in one or more embodiments, the digital identification system generates two textual elements, one with a fallback font and one with a customized digital font, and compares the two textual elements. For example, as mentioned previously, the digital identification system can specify one or more fallback fonts with regard to a web browser. Accordingly, the digital identification system can generate a textual element utilizing a fallback font. The digital identification system can compare the textual element utilizing a fallback font and a textual element utilizing a customized digital font.

Thus, with regard to FIG. 4C, the web browser renders the first textual element 422 utilizing a fallback font (i.e., Arial). The web browser then renders the second textual element 424 utilizing the customized digital font. The digital identification system compares the width of the first textual element (i.e., the fallback font) with the second textual element (i.e., the customized digital font) and determines if the widths correspond. If the widths do not match, the client device has the customized digital font. If the widths match, the client device does not have the customized digital font.

In this manner, the digital identification system can determine whether a client device has a customized digital font (even without identifying specific characters rendered with regard to a customized digital font). Indeed, by comparing one or more characteristics of a reference text rendered by the client device with one or more expected characteristics, the digital identification system can determine whether the client device has the customized digital font while reducing the computational time and resources required to identify characters of the reference text.

In one or more embodiments, the digital identification system utilizes JavaScript code to detect whether a client device has a customized digital font. In particular, the digital identification system utilizes JavaScript code to analyze the characteristics (e.g., width) of a rendered textual element to detect whether a client device has a customized digital font. For example, one or more embodiments of the digital identification system utilize the following JavaScript code to detect a customized digital font:

```
function detectFont(font){
    var sampleFonts = ['Calibri', 'Arial', 'Times New Roman'];
    var h = document.getElementsByTagName("body")[0];
    var s = document.createElement("span");
    s.style.fontSize = '72px';
    s.innerHTML = "Adobe Systems Inc."; //Out sample string
    var defaultwidth = { };
    var defaultHeight = { };
    for (var index in sampleFonts) {
        //get the default width for the three sample fonts
        s.style.fontFamily = sampleFonts[index];
        h.appendChild(s);
        defaultWidth[sampleFonts[index]] = s.offsetWidth;
        defaultHeight[sampleFonts[index]] = s.offsetHeight;
        h.removeChild(s);
    }
    var detected = false;
    for (var index in sampleFonts) {
        s.style.fontFamily = font + ',' + sampleFonts[index]; // name
    of the font along with the sample font for fallback.
        h.appendChild(s);
        var matched = (s.offsetWidth !=
        defaultWidth[sampleFonts[index]] || s.offsetHeight
    != defaultHeight[sampleFonts[index]]);
        h.removeChild(s);
        detected = detected || matched;
    }
    return detected;
}
window.onload = function( ){
    var font="Adobe Clean";
    if(detectFont(font)) alert(font + " present");
    else
        alert(font + " not present");
}
```

Although the previous example code utilizes JavaScript, it will be appreciated that the digital identification system can utilize an alternative programming language to detect a customized digital font. For example, in one or more embodiments, the digital identification system utilizes HTML and/or CSS. Utilizing the above code, however, the digital identification system can identify a client device based on a textual element rendered on a webpage.

Figure 5:
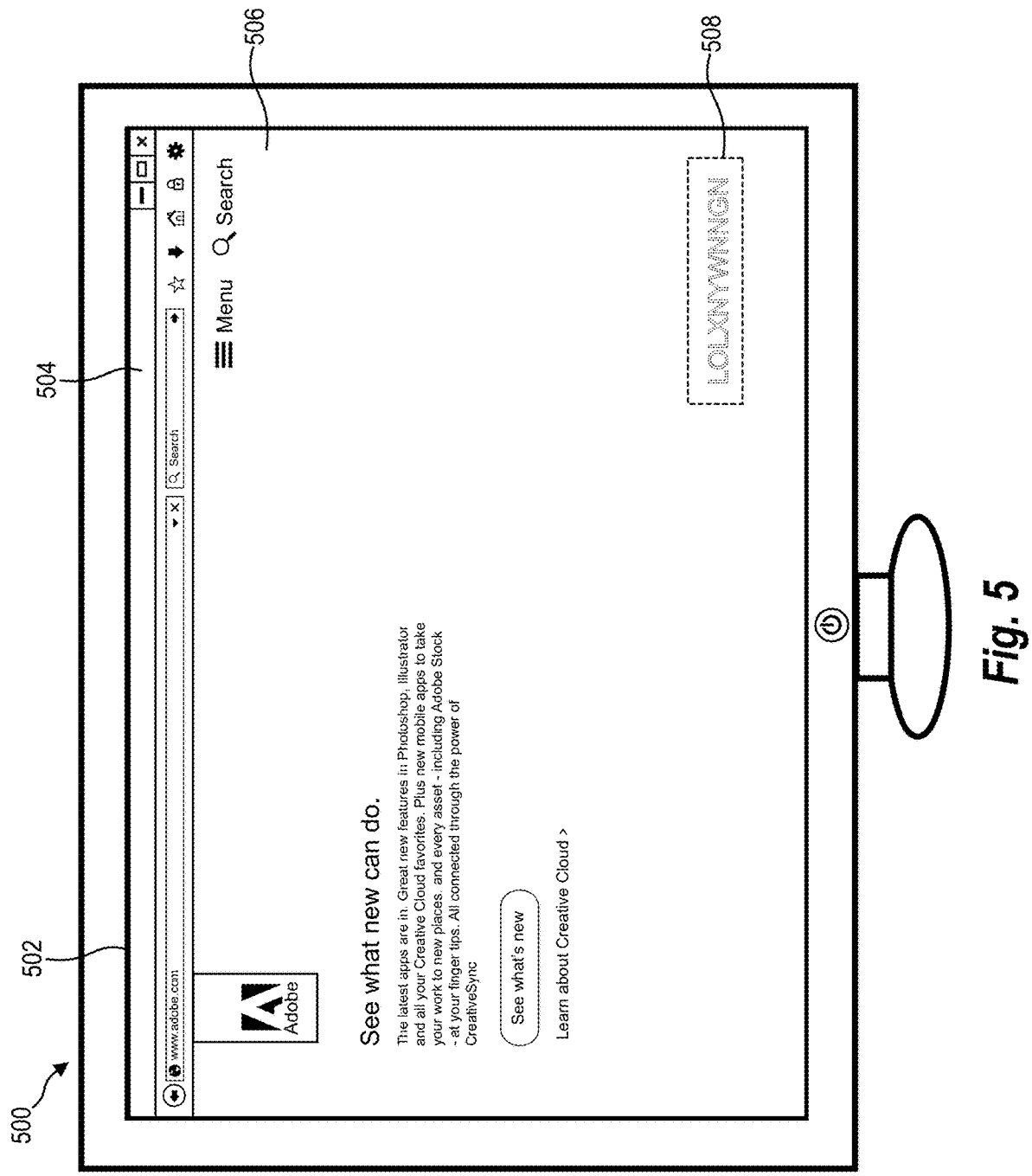
FIG. 5 illustrates a computing device running a web application with a user interface comprising a representation of a rendered textual element in accordance with one or more embodiments.

It will also be appreciated that the digital identification system can render any digital element via a web page utilizing a customized digital font. For example, FIG. 5 illustrates a computing device 500 with a screen 502 displaying a user interface 506 associated with a web browser 504. As illustrated, the web browser 504 navigates to a webpage (e.g., adobe.com) comprising an element 508.

In particular, the element 508 is a textual element received by the computing device 500 (via the web browser 504) from the website (i.e., a server hosting the website). Specifically, as described above, the website sends the computing device 500 a call to render a textual element (e.g. comprising a reference text) as part of the webpage utilizing a customized digital font. In response, the web browser 504 renders the element 508.

Depending on the embodiment, the element 508 may or may not be visible. For instance, the element 508 is represented in FIG. 5 as a dashed line with dashed textual characters indicating that the element 508 is not visible to a user of the computing device 500. In particular, the element 508 is a hidden element rendered on a canvas of the web page. In other embodiments, the element 508 is visible.

The website sends a call to render a reference text (e.g., "ILIKECHEESE") utilizing a customized digital font. As shown, the computing device 500 has the customized digital font, and thus renders the reference text utilizing the customized digital font (resulting in a textual element comprising the characters "LOLXNYWNNGN").

The website (e.g. a server hosting the website or another server associated with the website) can determine that the computing device 500 has the customized digital font by analyzing the element 508. In particular, as just described, the digital identification system analyzes the characteristics (e.g., the width, height, or other characteristics) of the element 508 and determines that the element 508 was rendered by utilizing the customized digital font. Accordingly, the digital identification system can determine that the computing device 500 has the customized digital font.

If the computing device 500 does not have the customized digital font, the computing device 500 would respond to a call to render a textual element utilizing the customized digital font by rendering a reference text utilizing a fallback font (e.g., Times New Roman or Ariel). Thus, for example, the computing device 500 would render the element 508 with the characters "ILIKECHEESE" (i.e., the reference text using a fallback fount) rather than "LOLXNYWNNGN" (i.e., the reference text using the customized digital font). In such circumstances, the digital identification system determines that the element 508 was rendered utilizing a font other than the customized digital font. Accordingly, in such circumstances, the digital identification system determines that the computing device 500 does not have the customized digital font.

As described above, the digital identification system can analyze a width of the textual element to determine whether a computing device has a customized digital font. In addition, to analyzing the width of an element, the digital identification system can also analyze the characters of an element to determine whether a computing device has a customized digital font. In particular, in one or more embodiments the digital identification system compares the characters of an element rendered by a client device on a webpage with expected characters of an element rendered utilizing a customized digital font.

For example, with regard to the embodiment of FIG. 5, the digital identification system can capture the element 508 and analyze the characters of the element 508 to determine whether the computing device 500 has the customized digital font. Specifically, the digital identification system can utilize the following JavaScript code to generate an image of an element rendered on the canvas of the webpage by the web browser 504:

```
<html>
    <body>
        <canvas id="canvas" style="border:2px solid black;"
        width="200" height="200">
        </canvas>
    </body>
    <script>
        var canvas = document.getElementById('canvas');
        var ctx = canvas.getContext('2d');
        var data = '<svg xmlns = "http://www.w3.org/2000/svg"
    width="200" height="200">' +
            '<foreignObject width="100%" height="100%">' +
            '<div xmlns="http://www.w3.org/1999/xhtml"
            style="font-size:40px">' +
                'em>I</em> like' +
                '<span style="color:white; text-shadow:0 0 2px
                blue;">' +
                'cheese</span>' +
            '</div>' +
            '</foreignObject>' +
            '</svg>';
```

-continued

```
var DOMURL = window.URL || window.webkitURL || window;
var img = new Image ( );
var svg = new Blob([data], {type:
'image/svg+xml;charset=utf-8'});
var url = DOMURL.createObjectURL(svg);
img.onload = function ( ) {
    ctx.drawImage(img, 0, 0);
    DOMURL.revokeObjectURL(url);
}
img.src = url;
</script>
</html>
```

One or more embodiments of the digital identification system utilize the foregoing code to capture an image of a rendered element. Moreover, one or more embodiments utilize the captured image to identify characters from the rendered element. For example, in one or more embodiments, the digital identification system applies an OCR algorithm to the captured image.

An OCR algorithm converts different types of digital documents, such as digital images, into editable and searchable data. For example, in one or more embodiments, the digital identification system utilizes an OCR algorithm that employs pre-processing techniques (e.g., de-skewing, despeckling, binarization, line removal, layout analysis, line and word deletion, or character isolation techniques), matrix matching (e.g. comparing an image to a stored glyph on a pixel-by-pixel basis), and/or feature extraction techniques (e.g., decomposing images into features and digitally comparing the features to representations of a character), and post-processing techniques (e.g., constraining the resulting characters to a base digital font) to identify characters in a digital image.

The OCR algorithm thus transforms an image into a plurality of characters. In particular, the OCR algorithm transforms an image into a plurality of characters from one or more fonts. Thus, for example, in one or more embodiments, the digital identification system utilizes an OCR algorithm to transform an image into a plurality of characters from the base digital font. In this manner, the digital identification system identifies or recognizes characters from an image captured from an element.

Moreover, the digital identification system then compares the identified characters to the customized digital font. In particular, the digital identification system compares the identified characters to expected characters if the reference text were rendered utilizing a customized digital font. If the characters match, the digital identification system determines that the client device has the customized digital font. If the identified characters do not match the expected characters, the digital identification system determines that the client device does not have the customized digital font.

Accordingly, the digital identification system utilizes an element rendered by a web browser (or characters identified from elements rendered by a web browser) as a font-based identification. In particular, the digital identification system utilizes an element rendered by a web browser as a font-based identification to identify a client device. As mentioned previously, however, the digital identification system can also identify a client device by comparing multiple font-based identifications from a client device. For example, the digital identification system can receive a rendered textual element from a web browser on a client device, receive another rendered textual element from a local digital asset on the client device, and compare the rendered textual elements.

Figure 6:
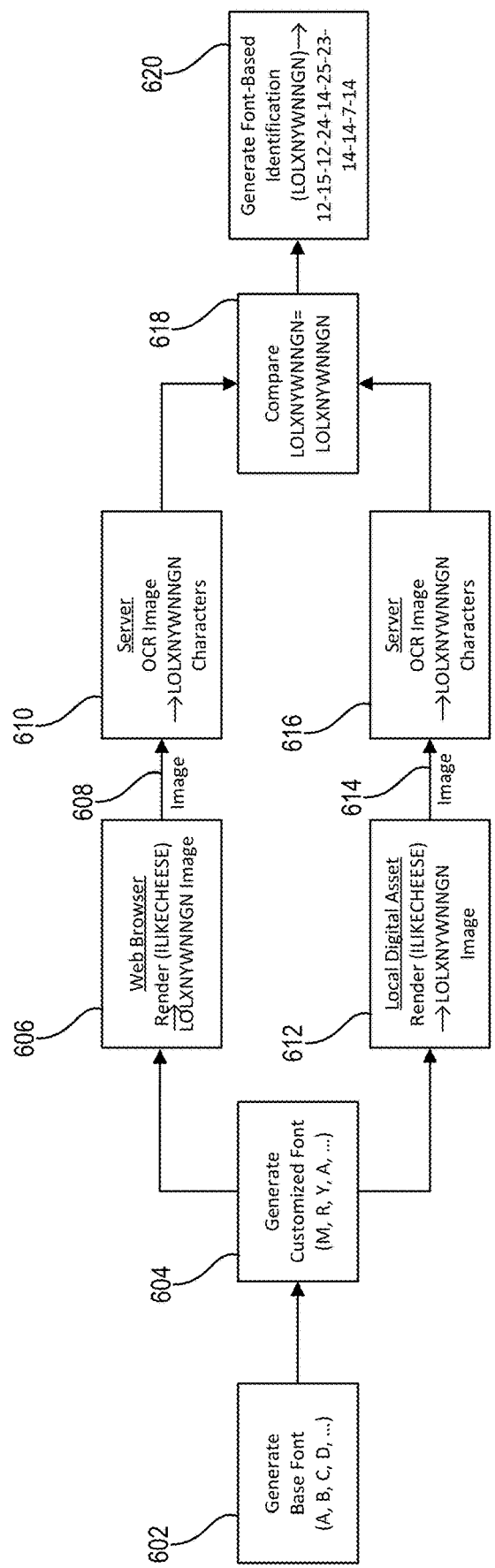
FIG. 6 illustrates a sequence diagram showing steps in a method of identifying a computing device in accordance with one or more embodiments.

In particular, FIG. 6 illustrates a sequence diagram comprising a sequence of steps 602-620 in a method of identifying a client device utilizing multiple font-based identifications. Specifically, at step 602, the digital identification system generates or accesses a base digital font (e.g., the base digital font 302 or the base digital font 312, such as "A, B, C, D, . . . "). At the step 604, the digital identification system generates a customized font (e.g., the customized digital font 304 or the customized digital font 314, such as "M, B, Y, A, . . . "). At the step 606, the digital identification system utilizes a web browser to render a textual element on a webpage utilizing the customized digital font. For example, the digital identification system utilizes a web browser to a render reference text, "ILIKECHEESE," as a textual element, "LOLXNYWNNGN," utilizing a customized digital font.

Thereafter, at the step 608, the digital identification system uploads the textual element to a server. In one or more embodiments, the digital identification system uploads the textual element as an image. For example, the digital identification system (via a server) can capture an image of the textual element and upload the image. Moreover, at the step 610, the digital identification system (i.e., via the server) applies an OCR algorithm to the uploaded image. Accordingly, at the step 610 the digital identification system can identify the characters of the textual element from the image (i.e., "LOLXNYWNNGN").

At the step 612, the digital identification system utilizes a local digital asset to render a textual element. For example, the digital identification system utilizes a software management application (e.g., ADOBE® CREATIVE CLOUD® software) installed on a client device to render a textual element. Specifically, the digital identification system utilizes the software management application to render a reference text, "ILIKECHEESE," as a textual element, "LOLXNYWNNGN," utilizing a customized digital font.

At the step 614, the digital identification system uploads the textual element created by the local digital asset to a server (e.g., the server referenced with regard to step 610). In particular, as shown, in one or more embodiments, the digital identification system utilizes the local digital asset (e.g., the software management application on the client device) to transform the textual element to an image and upload the image to the server.

At the step 616, the digital identification system (i.e., via the server) applies an OCR algorithm to the image created by the local digital asset. Utilizing the OCR algorithm, the digital identification system identifies the characters of the textual element (i.e., "LOLXNYWNNGN"). At step 618, the digital identification system compares characters generated from the step 610 and the step 616. Specifically, the digital identification system compares the characters generated from a textual element rendered by a web browser and characters generated from a textual element rendered by a local digital asset. The digital identification system can determine that the characters match (i.e., "LOLXNYWNNGN" from the step 610 equals "LOLXNYWNNGN" from the step 616). Similarly, the digital identification system can determine if the characters do not match.

Upon determining that characters from the web browser and characters from the local digital asset match, the digital identification system can perform a variety of steps. As illustrated by the step 620 in FIG. 6, in one or more embodiments, the digital identification system transforms characters into a new font-based identification. For example, as discussed previously, the digital identification system generates a new font-based identification that reflects variation from the base digital font (e.g., the font-based identification 324). Thus, for example, as shown in FIG. 6, the digital identification system can transform LOLXNYWNNGN to a new font-based identification "12-15-12-23-14-25-23-14-144-7-14."

Moreover, the digital identification system can utilize the new font-based identification. In particular, the digital identification system can utilize the new font-based identification to identify the client device. For example, the digital identification system maps the new font based identification to a database to associate the new font based identification to client information corresponding to the client device. Similarly, the digital identification system can utilize the new font-based identification to search for client information regarding the client device previously stored and mapped to a database.

Notably, however, by utilizing multiple textual elements (i.e., multiple font-based identifications), the digital identification system provides additional security in identifying a computing device. For example, the digital identification system reduces the risk of tampering or error with regard to a web browser by verifying font-based identifications (e.g., textual elements) from a web browser and another digital asset. Furthermore, the digital identification system can ensure that a client device will only access client information if the client device has the local digital asset.

Moreover, in obtaining a font-based identification from a local digital asset (e.g., a local digital asset that is not a web browser) the digital identification system can also exchange additional information to securely identify a client device. For example, the digital identification system can exchange a device ID or checksum from the local digital asset together with a font-based identification from the digital asset. The digital identification system can utilize the device ID and/or checksum together with the font-based identifications to add additional security and accuracy in identifying a client device.

Figure 7A:
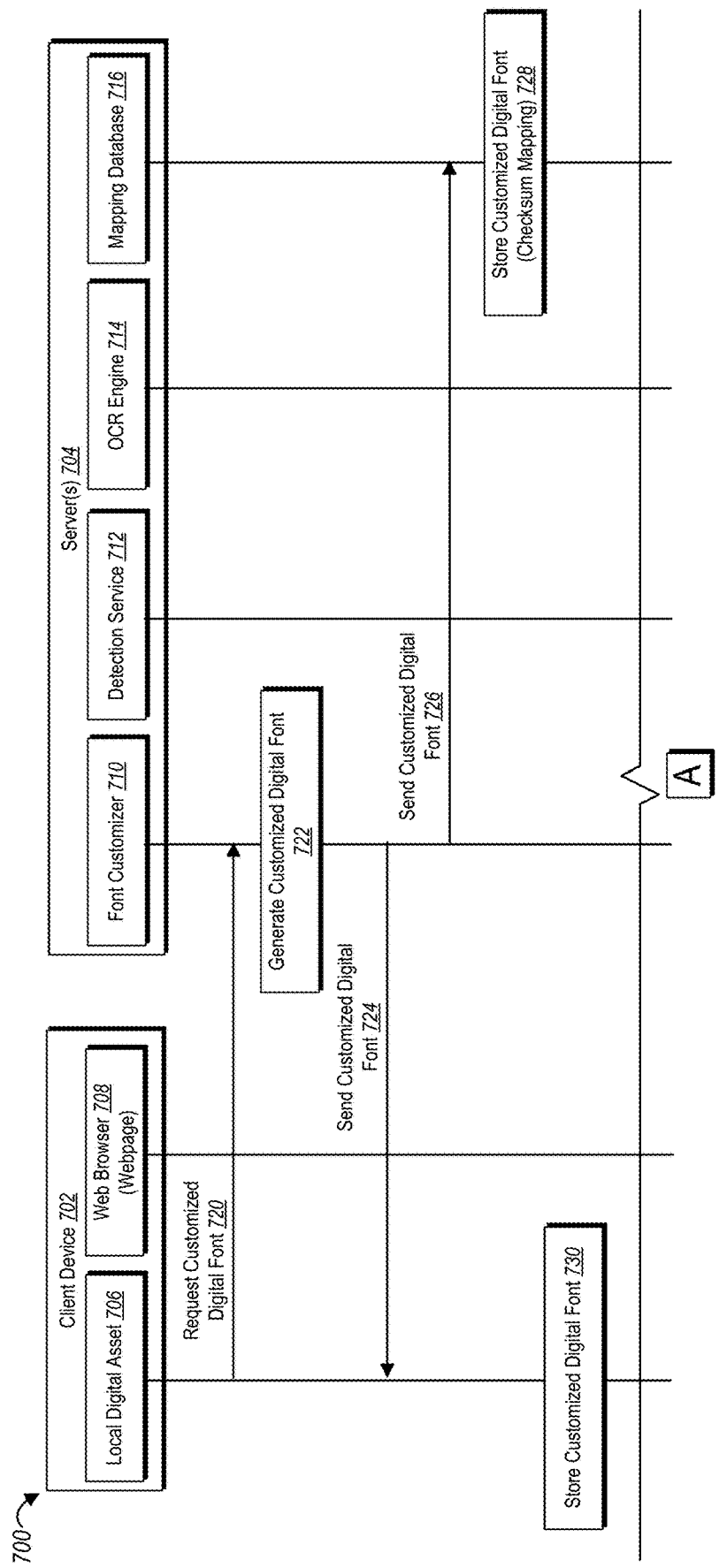
FIG. 7A-7E illustrates sequence diagrams showing steps in methods of identifying a computing device in accordance with one or more embodiments.

For example, FIG. 7A-7E illustrates a sequence diagram showing steps in a method of utilizing multiple font-based identifications, a device ID, and a checksum, to identify a client device in accordance with one or more embodiments. In particular, FIG. 7A illustrates a client device 702 and server(s) 704. The client device 702 comprises a local digital asset 706 and a web browser 708 (i.e., a web browser 708 interacting with a webpage hosted at the server(s) 704). Moreover, the server(s) 704 comprise a font customizer 710, a detection service 712, an OCR engine 714, and a mapping database 716.

The components 702-716 illustrated in FIG. 7 may be in communication with one another using any suitable communication technologies. It will be recognized that although components 702-716 are shown to be separate in FIG. 7, any of components 702-716 may be combined into fewer components, such as into a single facility or module, divided into more components, or configured into different components as may serve a particular embodiment.

Moreover, as described above, the local digital asset 706 can comprise any type of digital asset. In particular, with regard to the embodiment of FIG. 7, the local digital asset 706 comprises a desktop client of a software management application. Accordingly, the local digital asset 706 can detect and manage other digital assets. For example, the local digital asset 706 can detect state information with regard to other digital assets installed on the client device.

As shown, the method 700 includes the step 720 of sending a request from the local digital asset 706 to the font customizer 710. In particular the digital asset 706 sends a request for a customized digital font. The request can come in a variety of forms, including, for example, a request to download the local digital asset 706 or some other digital asset.

As illustrated in FIG. 7A, upon receiving the request for a customized digital font at step 720, the font customizer 710 performs the step 722 of generating a customized digital font. Moreover, the font customizer 710 performs the steps 724 of sending the customized digital font to the local digital asset 706 and the step 726 of sending the customized digital font to the mapping database 716. For example, in one or more embodiments, the font customizer 710 sends a customized digital font file (e.g., a font file entitled "Adobe-CustomFont") to the local digital asset 706 and the mapping database 716.

As shown in FIG. 7A, upon receiving the customized digital font (at step 726), the mapping database 716 can perform the step 728 of storing the customized digital font. In particular, the mapping database 716 can map the customized digital font to any client information or accounts associated with the client device 702.

Moreover, as shown in FIG. 7A, the mapping database 716 can also store and map a checksum corresponding to the customized digital font. In particular, the digital identification system can utilize a checksum algorithm or checksum function to generate a checksum based on a customized digital font. As used herein, the term "checksum" refers to a block of digital data generated to detect errors or modifications in a digital item. In particular, the term "checksum" includes digital data unique to a particular digital input.

Specifically, a checksum function can generate a unique checksum based on a particular data input. Any modification to the digital input to the checksum function results in generation of a different checksum. Thus, in one or more embodiments, the digital identification system provides a customized digital font as input to a checksum function. The checksum function then generates a checksum unique to the customized digital font.

In one or more embodiments, the digital identification generates a checksum based on a customized digital font and/or a device ID. As used herein, the term "device ID" refers to an identification that is unique to a particular computing device or digital asset on the computing device. For instance, the term "device ID" includes a unique number identifying a computing device that is stored by the computing device. Similarly, the term "device ID" includes a unique number identifying a digital asset installed on a computing device. In addition to a number, a device ID can come in a variety of forms, including alphabetic characters, icons, text, images, or some other form. For instance, in one or more embodiments, the device ID comprises a MAC Address.

Specifically, the digital identification system can generate a checksum by providing a customized digital font and a device ID as input to a checksum algorithm. In this manner, the checksum will change with variations in the customized digital font and/or the device ID. Accordingly, as illustrated in FIG. 7A, the mapping database 716 stores a checksum. In particular, the mapping database 716 maps the checksum to the particular customized digital font generated with regard to the client device 702 and client information or accounts corresponding to the client device 702.

Similarly, as shown in FIG. 7A, upon receiving the customized digital font (at step 724), the local digital asset 706 performs the step 730 of storing the customized digital font. In particular, the local digital asset 706 can store and register the customized digital font with the client device 702. For example, the local digital asset 706 registers the customized digital font such that the customized digital font is installed in memory (e.g., a font repository) on the client device.

Similarly, in other embodiments, the local digital asset 706 stores the customized digital font such that the customized digital font is only available for use by the client device 702 when the local digital asset 706 is installed and running on the client device 702. In this manner, one or more embodiments of the digital identification system add additional security by limiting access to the customized digital font at the client device.

Upon storing a customized digital font (e.g., at the client device 702 and the server(s) 704), the digital identification system also generates and stores a font-based identification. The digital identification system can generate a font-based identification at the server(s) 704 and/or the client device 702. For example, FIG. 7B illustrates generating a font-based identification utilizing the client device 702 and the server(s) 704, while FIG. 7C illustrates an alternative embodiment that generates a font-based identification utilizing the server(s) 704.

Figure 7B:
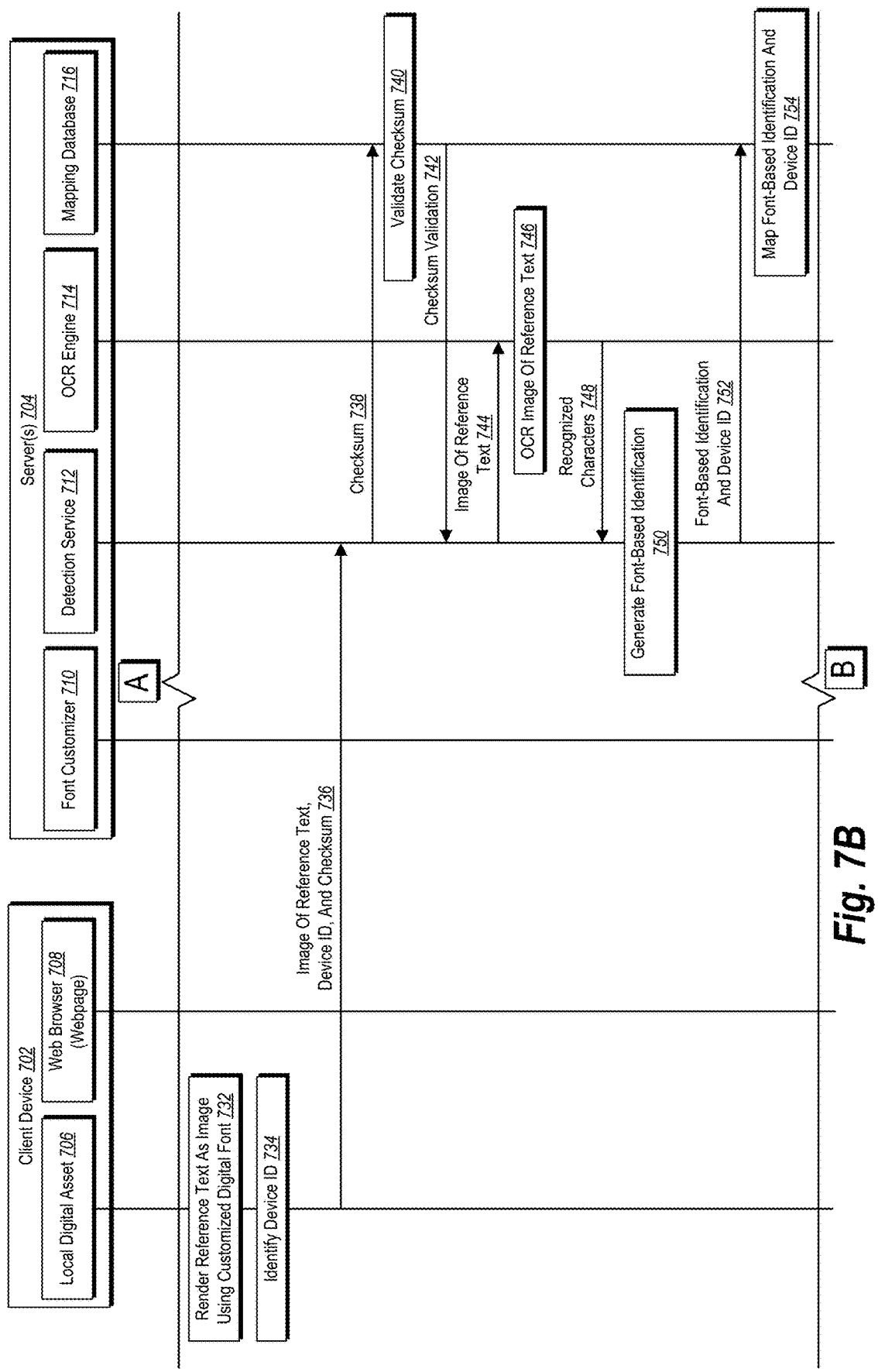
Figure 7C:
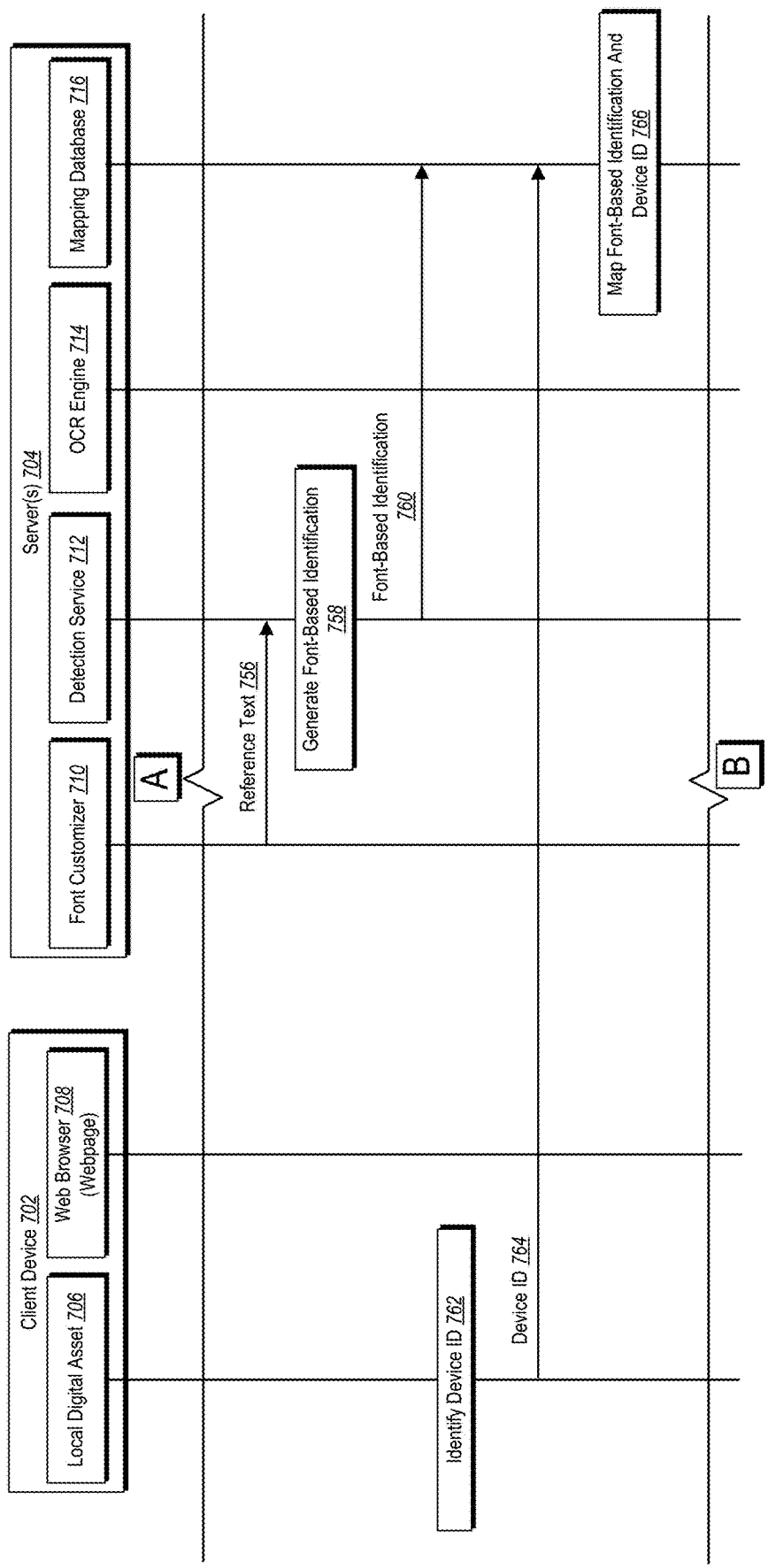

Specifically, FIG. 7B illustrates step 732, where the local digital asset 706 renders a reference text as an image using the customized digital font (e.g., the customized digital font received at the step 724). For example, the local digital asset 706 can receive the reference text from the server(s) 704 (e.g., in conjunction with the step 724 or at some other point in time), and the local digital asset 706 can render the reference text utilizing the customized digital font.

In addition, as shown in FIG. 7B at step 734, the local digital asset 706 can also identify a device ID. For example, the local digital asset 706 can identify a device ID unique to the client device (such as a MAC address). Similarly, the local digital asset 706 can generate a device ID unique to the client device 702. In addition, in one or more embodiments the local digital asset 706 can generate a device ID unique to the local digital asset 706.

Upon rendering a reference text as an image utilizing the customized digital font and identifying a device ID, the local digital asset 706 performs the act 736 of sending the image of the reference text, the device ID, and a checksum to the detection service 712. With regard to the checksum, the client device 702 (e.g., the local digital asset 706) can generate the checksum as discussed previously with regard to the step 728. In short, the client device 702 can generate a checksum utilizing a checksum function based on the customized digital font and/or device ID. The checksum can then be utilized to verify that the customized digital font has not been modified (or transferred to a different device).

For example, at step 738, the detection service 712 performs the step 738 of sending the checksum to the mapping database 716. The mapping database 716 performs the step 740 of validating the checksum. Specifically, the mapping database 716 compares the checksum received from the client device (at the step 736) with the checksum stored in the mapping database (at the step 728). If the mapping database 716 determines that the two checksum values correspond, the mapping database can validate the checksum received from the client device and perform the step 742 of sending a checksum validation to the detection service 712.

Upon receiving a checksum validation, the detection service 712 performs the step 744 of sending the image of the reference text received from the client device 702 to the OCR engine 714. As shown, the OCR engine 714 performs the step 746 of applying an OCR algorithm to the image of the reference text. In particular, the OCR engine 714 applies the OCR algorithm to the image of the reference text and recognizes the characters of the reference text.

Upon identifying the characters of the reference text, the OCR engine 714 performs the step 748 of sending the recognized characters to the detection service 712. Moreover, the detection service 712 performs the step 750 of generating a font-based identification. As discussed previously, a font-based identification can take a variety of forms. For example, in one or more embodiments the digital identification system utilizes the characters of the reference text as a font-based identification. In other embodiments, however, the digital identification system modifies characters of the reference text to generate a font-based identification. For example, with regard to the embodiment of FIG. 7B, the digital identification system generates a font based modification by transforming the recognized characters to a font-based identification based on the variation between the recognized characters and a base text (for example, a UID as described with regard to FIG. 3C).

As shown in FIG. 7B, upon generating a font-based identification, the detection service 712 performs the step 752 of sending the font-based identification and device ID to the mapping database 716. Moreover, the mapping database 716 performs the step 754 of mapping the font-based identification and device ID. In particular, the mapping database 716 maps the font-based identification and device ID as client information and associates the client information with an account or other information corresponding to the client device 702. In this manner, the digital identification system can utilize the client device 702 in generating a font-based identification and storing the font-based identification in conjunction with a device ID and other client information.

As shown in FIG. 7C, in one or more embodiments, the digital identification system initially generates and stores a font-based identification without utilizing the client device 702. In particular, the font customizer 710 performs step 756 of sending a reference text to the detection service 712. In particular, the font customizer 710 can send a reference text utilizing the customized digital font.

Moreover, the detection service 712 performs step 758 of generating a font-based identification. Specifically, the detection service 712 can detect the characters of the reference text send by the font customizer 710 and generate a font-based identification based on the reference text. The detection service 712 can utilize the reference text rendered utilizing the customized digital font as a font-based identification or the detection service 712 can transform the reference text rendered utilizing the customized digital font to some other font-based identification. Moreover, the detection service 712 can send the font-based identification to the mapping database 716 (at step 760).

In addition, as described previously (with regard to the step 734) the local digital asset 706 can perform the step 762 or identifying a device ID. Moreover, the local digital asset 706 can perform the step 764 of sending the device ID to the mapping database 716. Upon receiving the device ID and font-based identification, the mapping database 716 can perform the step 766 of mapping the font-based identification and device ID (as described with regard to step 754).

Figure 7D:
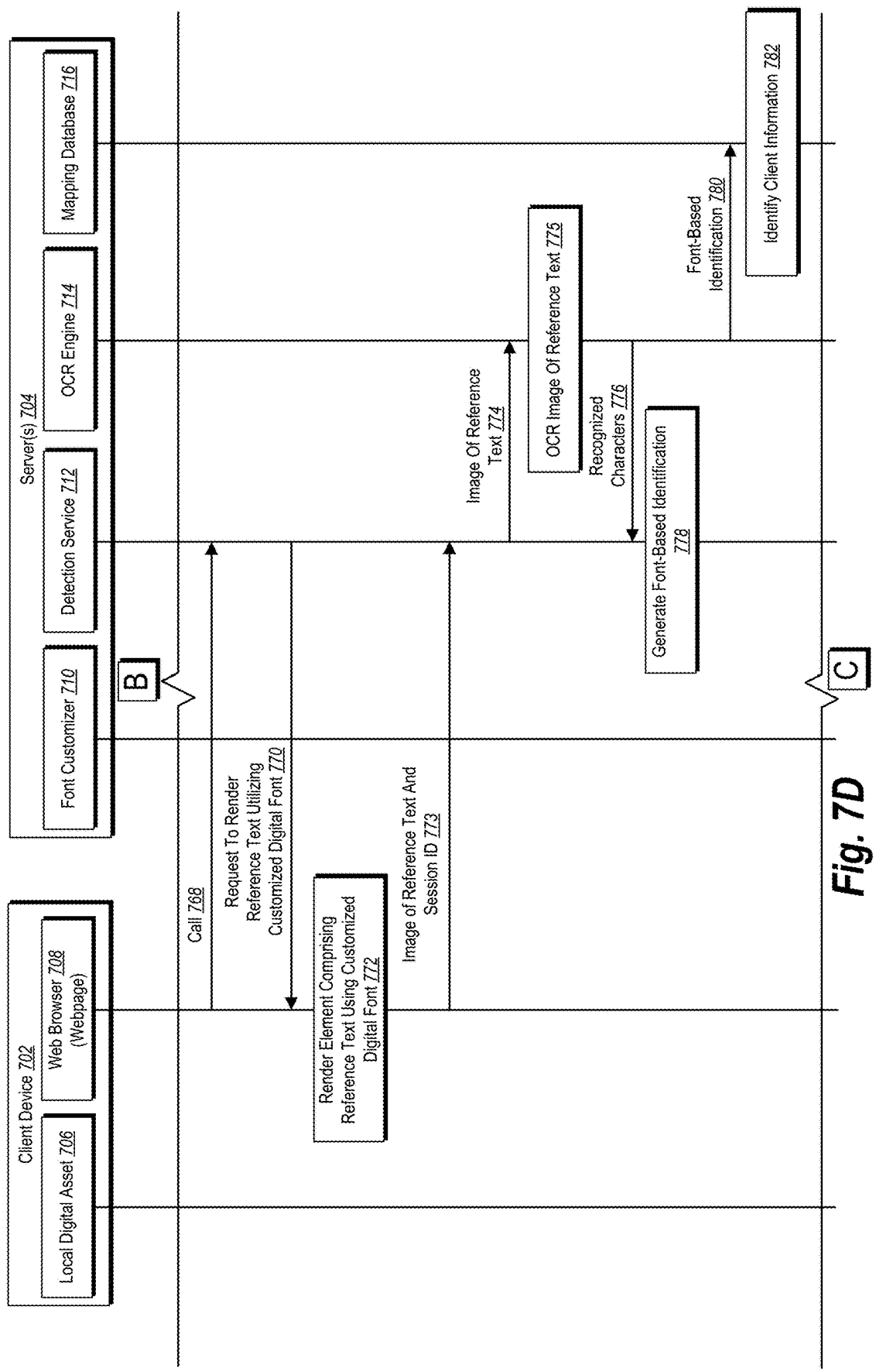

With a font-based identification associated mapped to other client information via the mapping database 716, the digital identification system can identify the client device 702 in relation to a subsequent web browser session. For example, FIG. 7D illustrates steps in identifying the client device 702 utilizing the customized digital font. In particular, as shown in FIG. 7D, the client device 702, via the web browser 708, can perform the step 768 of sending a call to the detection service 712. For example, the call can comprise the web browser 708 navigating to a website associated with the detection service 712.

Upon receiving a call from the web browser 708, the detection service 712 can perform the step 770 of sending a request to the web browser 708 to render the reference text utilizing the customized digital font (e.g., the customized digital font received by the client device 702 at the step 724). In particular, the request can comprise HTML instructions directing the web browser 708 to render a textual element comprising the reference text utilizing the customized digital font.

In response, the web browser 708 performs the step 772 of rendering an element comprising the reference text using the customized digital font. In particular, the web browser 708 can render a webpage with a hidden textual element comprising the reference text formatted with the customized digital font.

Furthermore, the web browser 708 and/or the detection service 712 perform the step 773 of sending an image of the reference text to the detection service 712. For example, in one or more embodiments, the detection service 712 captures a snapshot image of the webpage and the element comprising the reference text (as rendered by the web browser 708). Accordingly, the server(s) 704 can receive an image of the reference text by capturing an image of the element rendered by the web browser 708.

Moreover, as shown in FIG. 7D, the step 773 also comprises sending a session ID from the web browser 708 to the detection service 712. The session ID is a digital identifier (e.g., digital number) that identifies a current interactive session between a computing device and a server. The server(s) 704 can generate the session ID upon receiving a call from the client device 702. As outlined in greater detail below, the session ID can be utilized to synchronize or bind an interactive session of the web browser 708 and the server(s) 704 to the local digital asset 706.

As shown in FIG. 7D, the detection service can perform the step 774 of sending the image of the reference text to the OCR engine 714. In addition, the OCR engine 714 can perform the step 775 of applying an OCR algorithm to the image of the reference text. In this manner, the OCR engine 714 can recognize characters of the reference text rendered by the web browser 708. Moreover, the OCR engine 714 can perform the step 776 of sending the recognized characters to the detection service 712.

As shown, the detection service 712 performs the step 778 of generating a font-based identification and the step 780 of sending the font-based identification to the mapping database 716. Upon receiving the font-based identification, the mapping database 716 performs the step 782 of identifying client information. In particular, the mapping database 716 utilizes the font-based identification to locate and identify client information previously associated with the font-based identification. For example, the mapping database 716 utilizes the font-based identification to identify a device ID associated with the client device (e.g., the device ID mapped at step 754 or 766). In this manner, the digital identification system utilizes the customized digital font to identify the client device.

Figure 7E:
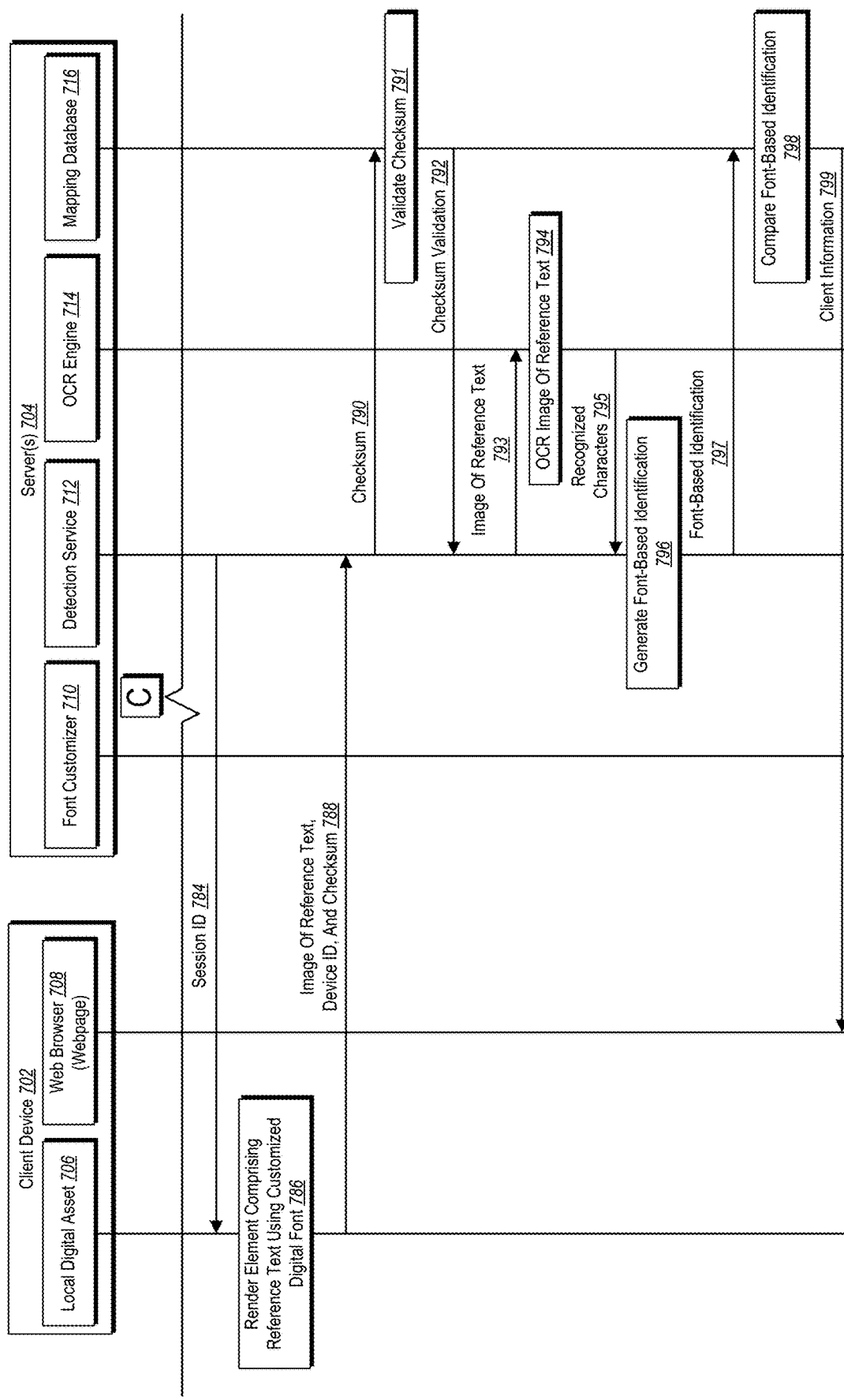

As mentioned previously, in one or more embodiments, the digital identification system utilizes multiple font-based identifications to identify the client device 702. Moreover, the digital identification system can synchronize or bind the local digital asset 706 to the session initiated by the client device 702 via the web browser 708. FIG. 7E illustrates utilizing the local digital asset 706 to generate another font-based identification to further identify the client device 702.

For example, upon identifying client information, such as a device ID, corresponding to the client device 702 (at step 782), the server(s) 704 can identify the client device 702. Specifically, the server(s) 704 can identify a particular desktop client associated with the local digital asset 706. Accordingly, the server(s) 704 can identify and correspond directly with the local digital asset 706. Thus, FIG. 7E illustrates (at step 784) the detection service 712 sending the session ID (e.g., the session ID of step 773) to the local digital asset 706.

It will be appreciated that although FIG. 7E illustrates sending the session ID, the detection service 712 and server(s) 704 can send a variety of additional or alternative calls, requests, or information. For example, rather than send the session ID, in one or more embodiments, the server(s) 704 send a request for the local digital asset 706 to render a textual element utilizing the reference text (or some other call).

As illustrated in FIG. 7E, upon receiving the session ID (or other call), the local digital asset 706 performs the step 786 of rendering the reference text as an image using the customized digital font (e.g., the customized digital font received at the step 724). Moreover, the local digital asset 706 performs the step 788 of sending the image of the reference text, the device ID (e.g., the device ID identified at the step 734 or 762), and the checksum (e.g., a checksum corresponding to the customized digital font and/or device ID) to the detection service 712.

The detection service 712 sends the checksum to the mapping database 716 (at step 790), the mapping database 716 validates the checksum (at step 791), and the mapping database 716 sends a checksum validation to the detection serve 712 (at step 792). Notably, by validating a checksum at this stage the digital identification system can ensure that the customized digital font has not been modified. Indeed, even if a user inadvertently or purposefully attempted to modify the customized digital font and send the modified customized digital font to the server(s) 704 via the web browser 708 (at steps 772 and 773), the checksum value corresponding to the customized digital font would be altered. Accordingly, when the client device 702 sends the checksum to the server(s) 704 for validation, the server(s) 704 can detect the modified checksum and refuse to authenticate the client device 702. Thus, the digital identification system can utilize the checksum to prevent unauthorized access to client information due to accidental or purposeful modifications to the customized digital font.

Moreover, as mentioned above, in one or more embodiments, the digital identification system also utilizes the device ID to further secure client information. For example, the digital identification system can conduct an independent verification that the device ID corresponds to the customized digital font provided by the client device 702. For example, the client device can compare the client ID mapped at the steps 754 or 766 to the customized digital font stored at the step 728 to verify that the device ID corresponds to the client device 702. In this manner, one or more embodiments of the digital identification system can ensure that, even if a user is logged into two different client devices (or the same digital asset is installed on two different client devices), the digital identification system can uniquely identify the client device 702.

As mentioned above, in one or more embodiments, the digital identification system generates the checksum based on both the customized digital font and the device ID. In such embodiments, validation of the checksum can ensure that the customized digital font remains unmodified and that the customized digital font corresponds to the client device 702.

Upon validating the checksum, the detection service 712 can send the image of the reference text received from the local digital asset 706 to the OCR engine 714 (at step 793), the OCR engine 714 can apply an OCR algorithm to the image of the reference text to recognize the characters of the reference text rendered by the local digital asset 706 (at step 794), and the OCR engine 714 can send the recognized characters to the detection service 712 (at step 795).

Thereafter, the detection service 712 generates a font-based identification (at step 796) and sends the font-based identification to the mapping database 716 (at step 797). The mapping database 716 performs step 798 of comparing font-based identifications. In particular, the mapping database 716 can compare the font-based identification originating from the web browser 708 (i.e., the font-based identification from step 780) with the font-based identification originating from the local digital asset 706 (i.e., the font-based identification from step 797).

In particular, if the font-based identifications match, the mapping database 716 can confirm the identity of the client device 702 and authenticate the client device 702. In particular, as shown, the mapping database 716 can perform the step 799 of providing client information to the web browser 708.

Notably, none of the steps 770-799 involve user interaction with the client device 702. Indeed, from the perspective of a user of the client device 702, upon navigating to a website (and sending a call to the detection service 712 at the step 768), the web browser 708 automatically receives client information (at step 799). The digital identification system did not require any login information or additional user interaction to securely authenticate the client device 702 and provide access to the client information.

Furthermore, with regard to the embodiments of FIGS. 7A-7E, the digital identification system synchronizes the client information provided via the web browser 708 (at the step 799) with client information stored by the local digital asset 706. Indeed, the mapping database 716 can receive client information from the local digital asset 706. Accordingly, upon identifying the client device 702, the mapping database 716 can provide the same client information via the web browser 708 that the mapping database 716 receives from the local digital asset 706. In this manner, the digital identification system can synchronize client information available via the web browser 708 and the local digital asset 706, even without obtaining user input of login information.

The digital identification system can obtain any type of client information from a local digital asset on a client device, synchronize the information with client information stored on a server, and then provide the synchronized client information via a web browser upon authentication of the client device. For example, FIG. 8 illustrates a schematic diagram showing steps of obtaining state information with regard to a digital asset on a client device, updating the state information on a server, authenticating the client device, and providing the updated state information via a web browser.

Figure 8:
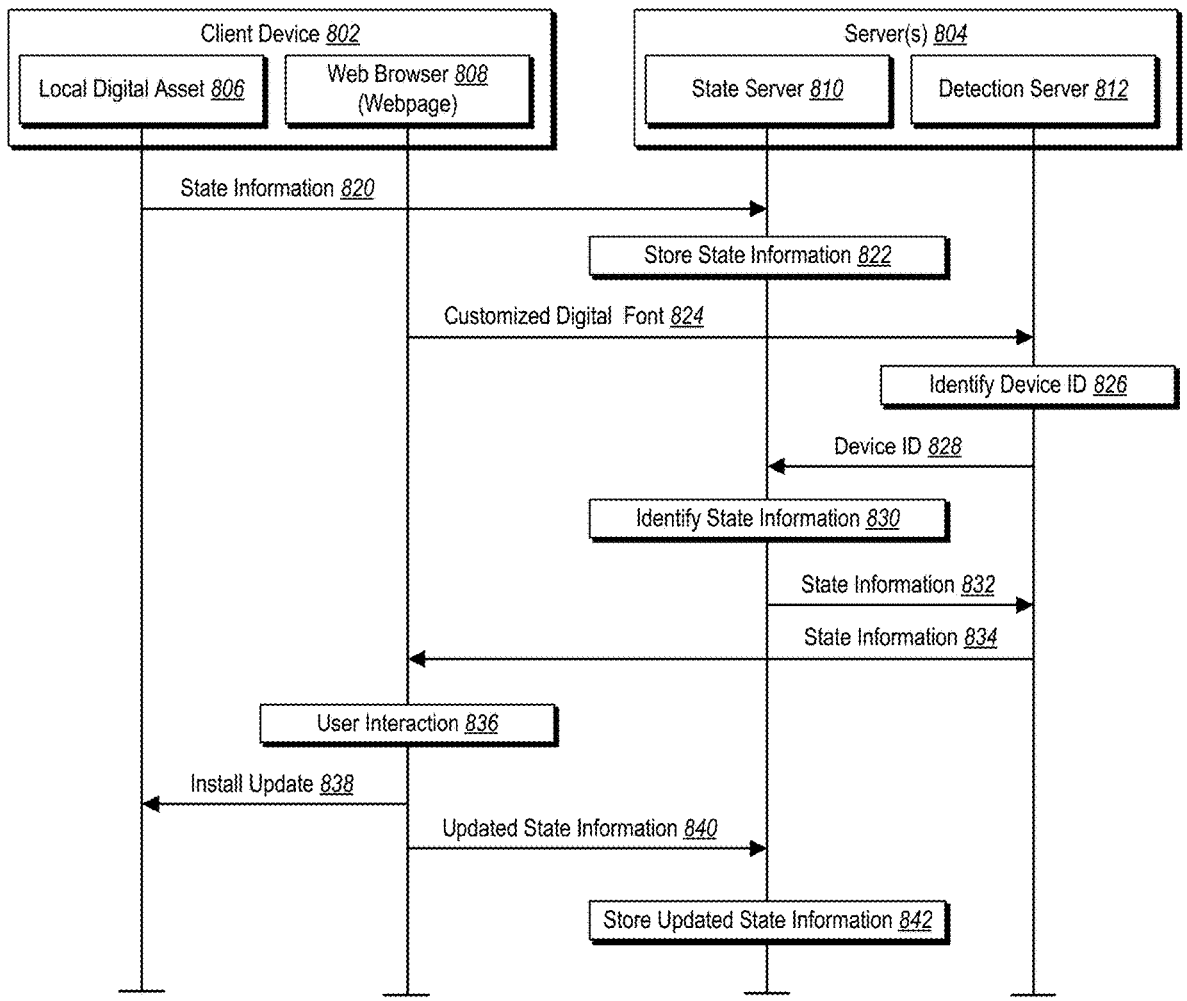
FIG. 8 illustrates a sequence diagram showing steps in a method of identifying state information corresponding to a computing device in accordance with one or more embodiments.

In particular, FIG. 8 illustrates a client device 802 comprising a local digital asset 806 and a web browser 808 (e.g., a web browser interacting with a web page hosted at the server(s) 804). Moreover, FIG. 8 illustrates server(s) 804 comprising a state server 810 and a detection server 812. As shown, the local digital asset 806 performs the step 820 of sending state information to the state server 810. For example, the local digital asset 806 sends state information indicating the particular digital assets installed on the client device together with configuration and settings corresponding to the particular digital assets. The state server 810 receives and stores the state information (at step 822). Accordingly, the state server 810 can receive, manage, and store state information corresponding to the client device 802.

Subsequently, the client device 802 can seek to obtain information from the server(s) 804 via a web browser and the digital identification system can authenticate the client device 802. Indeed, as described with regard to FIGS. 7A-7E, the digital identification system can authenticate the client device 802 via a web browser based on a customized digital font. Thus, with regard to FIG. 8 (and similar to FIGS. 7A-7E), at step 824, the web browser 808 sends a customized digital font to the detection server 812, and at step 826, the detection server 812 utilizes the customized digital font to identify a device ID previously associated with the client device 802 (i.e., the digital identification authenticates the client device 802).

Upon identifying a device ID, the detection server 812 sends the device ID to the state server 810 (at step 828). Moreover, the state server 810 utilizes the device ID to identify state information (at step 830) corresponding to the client device 802 (i.e., the state information received from the local digital asset 806, at step 820). The state server 810 sends the state information to the detection server 812 (at step 832).

Because the digital identification system had previously authenticated the client device 802 (i.e., at steps 824 and 826), the detection server 812 performs the step 834 of providing the state information to the web browser 808. Accordingly, the web browser 808 can receive the state information held by the local digital asset 806 via the web browser 808. Moreover, a user of the client device 802 can enjoy a seamless transition between the local digital asset 806 and data available via the web browser 808, without the need to provide additional login information via the web browser 808. In other words, the digital identification system binds the local digital asset 806 and the server(s) 804 so that the user can easily transition between the local digital asset 806 and the web browser 808.

Moreover, the client device 802 can download additional digital assets, and the digital identification system can further synchronize state information. For example, as illustrated, the web browser 808 receives a user interaction (at step 836) indicating a request to download an update to a digital asset. The web browser 808 receives and installs the update (at step 838) and send the updated state information to the state server 810 (at step 840). The state server 810 can store updated state information (at step 842).

Thus, the digital identification system can continuously receive state information or other client information with regard to the client device 802. Moreover, the digital identification system can synchronize the client information received from the client device 802 with regard to the local digital asset 806 and a web session between the web browser 808 and the server(s) 804. In this manner, as the digital identification system enables a user to seamlessly transition from the local digital asset 806 to a session via the web browser 808.

Figure 9:
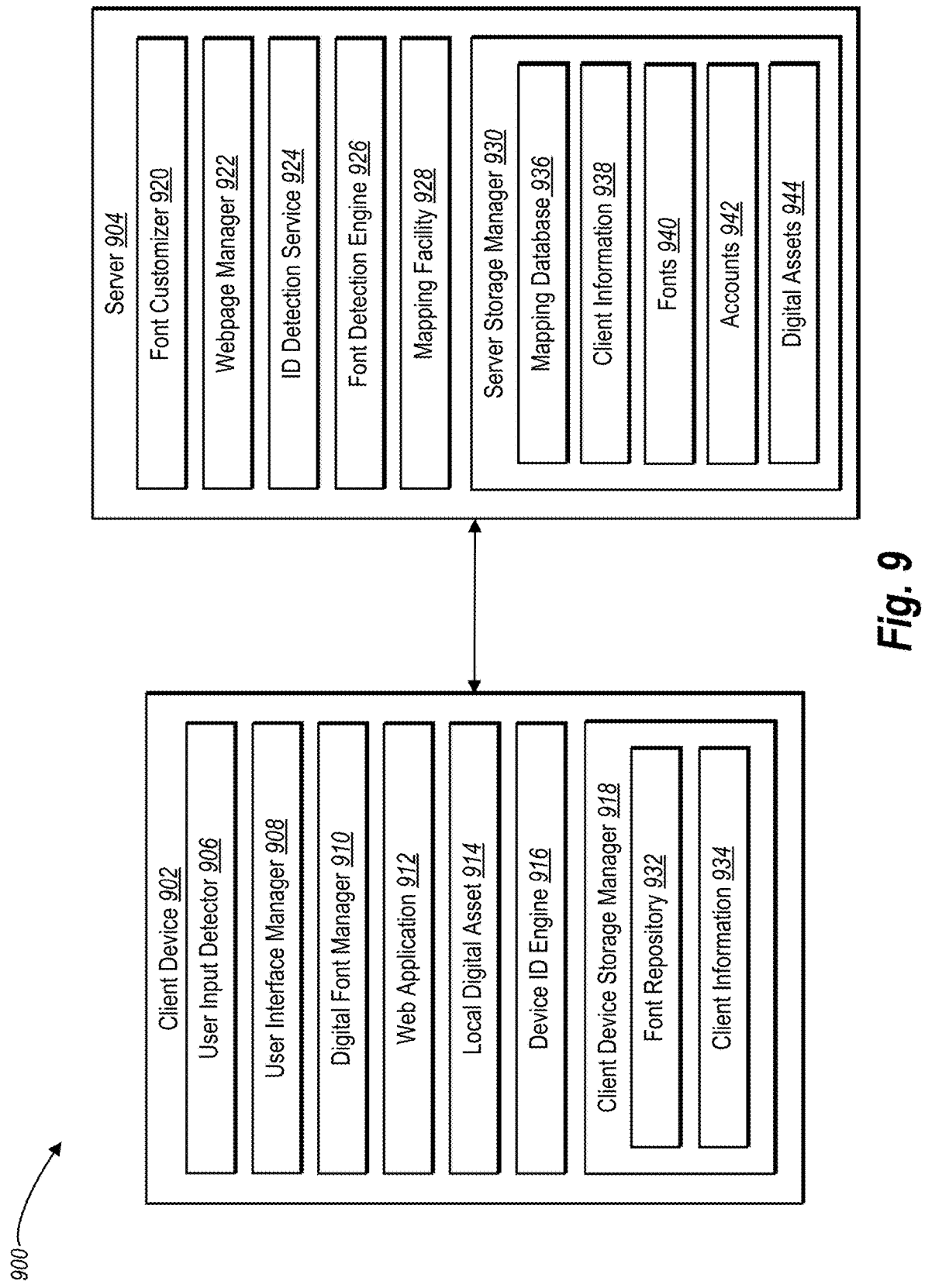
FIG. 9 illustrates a schematic diagram of an example architecture of a digital identification system in accordance with one or more embodiments.

Turning now to FIG. 9, additional detail will be provided regarding components and capabilities of one embodiment of the digital identification system. In particular, FIG. 9 illustrates an embodiment of an exemplary architecture of a digital identification system 900 (e.g., the digital identification system described above). As shown, the digital identification system 900 may include, but is not limited to, a client device 902 (e.g., the client devices 102, 702, 802 or the computing devices 200, 500) and a server 904 (e.g., the servers 104, 704, 804). Moreover, as shown, the client device 902 includes, but is not limited to a user input detector 906, a user interface manager 908, a digital font manager 910, a web application 912, a local digital asset 914, a device ID engine 916, and a client device storage manager 918 (comprising a font repository 932 and client information 934). Furthermore, as shown in FIG. 9, the server 904 includes, but is not limited to, a font customizer 920, a webpage manager 922, an ID detection service 924, a font detection engine 926, a mapping facility 928, and a server storage manager 930 (comprising a mapping database 936, client information 938, fonts 940, accounts 942, and digital assets 944).

As just mentioned, and as illustrated in FIG. 9, the client device 902 includes the user input detector 906. The user input detector 906 detects, identifies, monitors, receives, processes, captures, and/or records various types of user input. For example, the user input detector 906 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 906 operates in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 906 detects and identifies various types of user interactions with user input devices, such as select events, drag events, scroll events, and so forth. For example, in the event the client device 902 includes a touch screen, the user input detector 906 detects one or more touch gestures (e.g., swipe gestures, tap gestures, pinch gestures, or reverse pinch gestures) from a user that forms a user interaction.

The user input detector 906 communicates with, and thus detects user input with respect to a variety of programs, applications, plug-ins, operating systems, user interfaces, or other implementations in software or hardware. For example, the user input detector 906 can recognize user input provided in conjunction with the web application 912 or the local digital asset 914.

As just mentioned, and as illustrated in FIG. 9, the client device 902 also includes the user interface manager 908. The user interface manager 908 provides, manages, and/or controls a graphical user interface (or simply "user interface") for use with the digital identification system 900. In particular, the user interface manager 908 can facilitate presentation of information by way of an external component of the client device 902. For example, the user interface manager 908 can display a user interface by way of a display screen associated with the client device 902. The user interface may be composed of a plurality of graphical components, objects, and/or elements that allow a user to perform a function. The user interface manager 908 presents, via the client device 902, a variety of types of information, including text, images, video, audio, characters, or other information. Moreover, the user interface manager 908 provides a variety of user interfaces specific to any variety of functions, programs, applications, plug-ins, devices, operating systems, and/or components of the client device 902 (e.g., the user interface 206, the user interface 506, or a user interface associated with the local digital asset 914).

The user interface manager 908 can provide a user interface with regard to a variety of operations or applications (e.g., the web application 912 or the local digital asset 914). For example, the user interface manager 908 provides a user interface that facilitates managing, selecting, identifying, searching, or downloading digital assets. Similarly, the user interface manager 908 can generate a user interface that facilitates managing, editing, modifying, downloading, uploading, or sending digital images. Additional details with respect to various example user interface elements are described throughout with regard to various embodiments containing user interfaces.

As shown in FIG. 9, the client device 902 also includes the digital font manager 910. The digital font manager 910 can send, receive, register, record, and/or manage one or more digital fonts. In particular, the digital font manager 910 can receive (e.g., from the server 904) one or more customized digital fonts. Moreover, the digital font manager 910 can register a customized digital font with the client device 902 such that the client device 902 (e.g., the web application 912 and the local digital asset 914) can utilize the customized digital font. The digital font manager 910 can also record a customized digital font (e.g., to the font repository 932).

As illustrated, the digital font manager 910 may be implemented as a separate component of the digital identification system 900; however, in one or more embodiments the digital font manager 910 may be implemented as a part of other components of the digital identification system 900. For example, in one or more embodiments, the digital font manager 910 is implemented as part of the local digital asset 914. In particular, in one or more embodiments, the digital font manager 910, as part of the local digital asset 914, receives a customized digital font (e.g., from the serer 904) and registers the customized digital font with the client device 902. Similarly, in one or more embodiments, the local digital asset 914 sends a customized digital font (e.g. to the server 904).

In addition, the digital font manager 910 may also be implemented as part of the web application 912. For example, in one or more embodiments, the web application 912 sends a customized digital font (e.g., to the server 904). As just mentioned, and as illustrated in FIG. 9, the client device 902 also includes the web application 912. The web application 912 includes a software application capable of accessing a website hosted on a server and providing a webpage for display. The web application 912 can also send and receive information with regard to one or more servers (e.g., web servers). For example, in one or more embodiments, the web application 912 includes a web browser (e.g. the web browsers 204, 504, 708, or 808). More specifically, the web application 912 includes software applications such as Explorer, Chrome, Firefox, Safari, or other commercially available web browsers.

In one or more embodiments, the web application 912 provides a customized digital font (e.g., to the server 904). In particular, in one or more embodiments, the web application 912 can provide a customized digital font, a font-based identification, a textual element, an image or some other digital information reflecting a customized digital font.

The web application 912 can also utilize a customized digital font. For example, the web application 912 can access a customized digital font (e.g., from the digital font manager 910 or the font repository 932) and render an element on a webpage utilizing the customized digital font. More specifically, in one or more embodiments, the web application 912 receives a request from the server 904 to render a textual element comprising a reference text utilizing a customized digital font. The web application 912 renders a textual element based on the reference text utilizing the customized digital font (e.g. as part of rendering a webpage).

The web application 912 can also receive and utilize client information (e.g., client information 938 from the server 904). For example, the web application 912 can receive client information (e.g., state information regarding digital assets, payment information or contact information) and provide the client information for display. Similarly, the web application 912 can receive access credentials (e.g., an access token) and utilize the access token to access one or more servers.

Furthermore, the web application 912 can download one or more digital assets. For example, the web application 912 can download digital assets from the server 904. In particular, in one or more embodiments, the web application 912 downloads the local digital asset 914 from the server 904 (e.g., from the digital assets 944) in conjunction with downloading a customized digital font.

As illustrated in FIG. 9, the client device 902 also includes the local digital asset 914. The local digital asset 914 can comprise any type of digital asset (e.g., the local digital assets 706 or 806). In one or more embodiments, the local digital asset 914 comprises a desktop client application. For example, the local digital asset 914 can comprise a software management application (e.g., ADOBE® CREATIVE CLOUD® software). In other embodiments, the local digital asset 914 comprises another software application, such as a photo-editing software application.

The local digital asset 914 can send or receive information from the server 904. For example, in one or more embodiments, the local digital asset 914 receives a customized digital font from the server 904. Similarly, in one or more embodiments, the local digital asset 914 sends client information (such as state information) to the server 904. Moreover, the local digital asset 914 can send a device ID or checksum (e.g., from the device ID engine 916).

The local digital asset 914 can also provide a customized digital font (e.g., to the server 904). In particular, in one or more embodiments, the local digital asset 914 can provide a customized digital font, a font-based identification, a textual element, an image or some other digital information reflecting a customized digital font.

The local digital asset 914 can also utilize a customized digital font. For example, in one or more embodiments, the local digital asset 914 renders a textual element comprising reference text utilizing a customized digital font. Moreover, in one or more embodiments the local digital asset 914 sends the textual element to the server 904.

As illustrated in FIG. 9, the client device 902 also includes the device ID engine 916. The device ID engine 916 can generate, identify, create, determine, provide, or receive one or more device IDs. In particular, the device ID engine 916 can identify a device ID that uniquely identifies a client device. Similarly, the device ID engine 916 can identify a device ID that uniquely identifies a digital asset on the client device.

The device ID engine 916 can also create or generate a checksum. For example, in one or more embodiments, the device ID engine 916 includes a checksum algorithm that creates a checksum based on one or more input values. In particular, the device ID engine 916 can generate a checksum based on a customized digital font. Similarly, the device ID engine 916 can generate a checksum based on a device ID. In this manner, the device ID engine 916 can create a checksum unique to a customized digital font and/or a device ID.

In addition to the device ID engine 916, as illustrated in FIG. 9, the client device 902 also includes the client device storage manager 918. The client device storage manager 918 maintains data for the digital identification system 900. The client device storage manager 918 can maintain data of any type, size, or kind, as necessary to perform the functions of the digital identification system 900.

In particular, as illustrated in FIG. 9, the client device storage manager 918 includes the font repository 932. The font repository 932 includes fonts, characters, styles, glyphs, or other information relating to one or more digital fonts utilized by the client device 902. In particular, the font repository 932 includes information regarding one or more customized digital fonts received or utilized by the client device 902.

Moreover, as illustrated in FIG. 9, the client device storage manager 918 also includes client information 934. In particular, client information 934 includes any client information received, generated, identified, or utilized by the client device 902. For example, the client information 934 includes state information regarding digital assets associated with the client device 902. Similarly, client information 934 includes information regarding one or more users of the client device 902.

As mentioned above, in addition to the client device 902, the digital identification system 900 also includes the server 904. As illustrated in FIG. 9 the server 904 includes the font customizer 920. The font customizer 920 (e.g., the font customizer 710) can create, generate, build, and/or modify one or more digital fonts. For example, the font customizer 920 can generate a base digital font. Moreover, the font customizer 920 can modify a base digital font to generate a customized digital font.

As described previously, the font customizer 920 can generate a base digital font utilizing any combination of characters, including alpha-numeric symbols, icons, or other glyphs. The font customizer 920 can also utilize existing digital fonts (e.g., Times New Roman, Arial, Calibri) as base digital fonts. Moreover, the font customizer 920 can combine characters from existing digital fonts to generate a base digital font.

In addition, as mentioned, the font customizer 920 (e.g., the character randomizer 306) can create a customized digital font utilizing a base digital font. For example, in one or more embodiments, the font customizer 920 modifies the position of characters in a base digital font to generate a customized digital font. Similarly, the font customizer 920 can modify the orientation (e.g., rotation), size, height width, spacing, or other characteristics of characters in a base digital font.

The font customizer 920 can create a customized digital font unique to a particular client device or digital asset. Thus, the font customizer 920 can create a customized digital font unique to the client device 902 (or unique to the local digital asset 914).

In one or more embodiments, the font customizer 920 can generate a plurality of customized digital fonts with regard to a client device. For example, in one or more embodiments, the font customizer 920 can create a plurality of customized digital fonts with regard to a plurality of local digital assets installed on the client device 902. For instance, the font customizer 920 can create a first customized digital font for a first digital asset and a second customized digital font for a second digital asset. The digital identification system 900 can then utilize the first customized digital font to determine that the client device 902 has the first digital asset and utilize the second customized digital font to determine that the client device 902 has the second digital asset. The font customizer 920 can generate any number or type of customized digital fonts to perform the functions of the digital identification system.

As shown in FIG. 9, the server 904 also includes the webpage manager 922. The webpage manager 922 can generate, create, provide, send, manage, and/or host one or more webpages or websites. For example, the webpage manager 922 can host a website and provide a webpage (e.g., text with HTML instructions) from the website to the web application 912 upon request by the web application 912.

The webpage manager 922 can provide any type or variety of webpages with any type or variety of webpage elements. For example, the webpage manager 922 can provide a webpage with instructions for rendering one or more images, texts, videos, menus, options or other elements. For instance, the webpage manager 922 can provide a webpage with instructions for rendering (e.g., via a webpage canvas) a textual element comprising reference text. Moreover, the webpage manager 922 can provide a webpage with instructions for rendering the textual element utilizing a customized digital font.

The webpage manager 922 can also receive information from the web application 912 and the client device 902. For example, the webpage manager 922 can receive a customized digital font from the client device 902. For example, in one or more embodiments, the webpage manager 922 can capture a textual element rendered by the web application 912 utilizing a customized digital font (e.g., via a webpage canvas utilized to render the textual element). More specifically, as described above, the webpage manager 922 can utilize JavaScript code (or some other code) to capture an image of a textual element rendered by the web application 912 utilizing a customized digital font.

The webpage manager 922 can also generate one or more session IDs. For example, the webpage manager 922 can receive a call from the web application 912 and generate a session ID unique to the interactive session with the web application 912. In addition to the webpage manager 922, FIG. 9 also illustrates that the server 904 includes the ID detection service 924 (e.g., the detection service 712 or the detection service 812). The ID detection service 924 can send, receive, and/or validate digital information between the server 904 and the client device 902. In particular, the ID detection service 924 can receive information utilized to identify the client device 902.

For example, the ID detection service 924 can receive a customized digital font generated by the client device 902. In particular, the ID detection service 924 can receive a textual element (e.g., via the webpage manager 922) generated by the web application 912 utilizing a customized digital font. Moreover, the ID detection service 924 can receive a textual element generated by the local digital asset 914 utilizing a customized digital font. Similarly, the ID detection service 924 can receive a device ID or checksum from the client device 902 (e.g., from the local digital asset 914).

The ID detection service 924 can also generate one or more font-based identifications. For example, the ID detection service 924 can receive a textual element and transform the textual element to a font-based identification. For example, the ID detection service 924 can transform characters of a textual element into a font-based identification comprising a numerical code reflecting variation from the characters of the textual element and a base digital font.

In addition, the ID detection service 924 can also generate a checksum. The ID detection service 924 can include a checksum algorithm that generates a checksum specific to customized digital font and/or client ID.

Furthermore, as shown in FIG. 9, the server 904 also includes the font detection engine 926. The font detection engine 926 can identify, detect, determine, recognize, distinguish, categorize, and/or classify one or more digital fonts. In particular, the font detection engine 926 can analyze an element rendered by the client device 902 and determine whether the element reflects a customized digital font.

As described above, the font detection engine 926 can compare one or more characteristics of an element to determine whether the element reflects a customized digital font. For example, in one or more embodiments, the font detection engine 926 compares the width of a textual element rendered by the client device 902 with an expected width of a textual element rendered utilizing the customized digital font. In this manner, the digital identification system 900 can determine that the client device 902 has received a customized digital font (and/or a digital asset).

In one or more embodiments, the font detection engine 926 can also identify one or more characters from a textual element. For example, in one or more embodiments, the font detection engine 926 receives an image of a textual element (e.g., from the webpage manager 922) and identifies characters from the image of the textual element. Specifically, the font detection engine 926 (e.g., the OCR engine 714) can apply an OCR algorithm to identify characters from the image of the textual element. More specifically, the font detection engine 926 can apply an OCR algorithm utilizing a base digital font to identify characters from the base digital font in the image of the textual element.

The font detection engine 926 can compare one or more font-based identifications to determine whether a client device has a customized digital font. For example, the font detection engine 926 can compare a font-based identification generated based on an element rendered by the web application 912 and a font-based identification generated based on an element rendered by the local digital asset 914 and determine whether the font-based identifications match.

Moreover, as illustrated in FIG. 9, the server 904 also includes the mapping facility 928. The mapping facility 928 can associate, map, compare, manage, and/or search for digital information stored at the server 904 (e.g., via the serve storage manager 930). In particular, the mapping facility 928 can associate client information with the client device 902. For example, the mapping facility 928 can associate client information 926 (e.g., state information, a client ID, a font-based identification, a session ID) regarding the client device 902 with an account associated with the client device 902 (and/or a customized digital font corresponding to the client device 902).

As mentioned, the mapping facility 928 can also conduct searches. In particular, the mapping facility 928 can search for information to identify the client device 902. For example, the mapping facility 928 can receive a font-based identification, conduct a search for the font-based identification, and determine that the font-based identification is associated with a device ID (or other client information) particular to the client device 902.

In addition, as illustrated in FIG. 9, the server 904 also includes the server storage manager 930. The server storage manager 930 maintains data for the digital identification system 900. The server storage manager 930 can maintain data of any type, size, or kind, as necessary to perform the functions of the digital identification system 900. As illustrated, the server storage manager 930 includes the mapping database 936. The mapping database 936 can define associations between digital information. For example, the mapping database 936 can comprise a database defining associations or relations between client information 938, accounts 942, fonts 940 and/or digital assets 944. Although illustrated with regard to FIG. 9 as separate components, it will be appreciated that the mapping database 936 can include client information 938, fonts 940, accounts 942, and/or digital assets 944.

As just mentioned, as illustrated in FIG. 9, the server storage manager 930 includes client information 938. Client information 938 includes digital information regarding client devices and users associated with client devices. For example, client information 938 includes state information, contact information, purchase information, payment information, user preferences, user interests, device IDs, session IDs, font-based identifications and any other information regarding a client device or a user associated with a client device.

Furthermore, as shown in FIG. 9, the server storage manager 930 also include fonts 940. Fonts 940 include any fonts utilized by the digital identification system 900. Fonts 940 include customized digital fonts generated with regard to client devices and/or digital assets.

In addition, as shown in FIG. 9, the server storage manager 930 also includes accounts 942. The accounts 942 can include unique identifiers (e.g., account numbers or names) and/or information repositories specific to a client device and/or user of a client device. The accounts 942 can include information regarding a client device and/or user of a client device. Accordingly, in one or more embodiments, the accounts 942 comprise a source of client information 938. For example, the accounts 942 can include personal information related to users of the digital identification system 900, such as, payment information, product information (e.g., purchase history or selected products), user interests, demographic information, or contact information.

Moreover, as shown in FIG. 9, the server storage manager 930 can also include digital assets 944. The digital assets 944 can include any digital asset utilized by the digital identification system 900. For example, the digital assets 944 can include the local digital asset 914. The server 904 can provide one or more of the digital assets 944 to the client device 902 for installation. Thus, for example, the client device 902 can send a call to the server 904 (e.g., a call to the webpage manager 920 and/or the ID detection service 924) and the server 904 can provide one or more of the digital assets 944 for download and installation to the client device 902 (e.g., in conjunction with a customized digital font).

Each of the components 906-930 of the digital identification system 900 and their corresponding elements (as shown in FIG. 9) may be in communication with one another using any suitable communication technologies. It will be recognized that although components 906-930 of the digital identification system 900 and their corresponding elements are shown to be separate in FIG. 9, any of components 906-930 and their corresponding elements may be combined into fewer components, such as into a single facility or module, divided into more components, or configured into different components as may serve a particular embodiment.

The components 906-930 of the digital identification system 900 and their corresponding elements can comprise software, hardware, or both. For example, the components 906-930 and their corresponding elements can comprise one or more instructions stored on a computer-readable storage medium and executable by processors of one or more computing devices. When executed by the one or more processors, the computer-executable instructions of the digital identification system 900 can cause a client device and/or a server device to perform the methods described herein. Alternatively, the components 906-930 and their corresponding elements can comprise hardware, such as a special purpose processing device to perform a certain function or group of functions. Additionally or alternatively, the components 906-930 and their corresponding elements can comprise a combination of computer-executable instructions and hardware.

Furthermore, the components 906-930 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 906-930 may be implemented as a stand-alone application, such as a desktop or mobile application. Furthermore, the components 906-930 may be implemented as one or more web-based applications hosted on a remote server. Alternatively or additionally, the components 906-930 may be implemented in a suit of mobile device applications or "apps." To illustrate, the components 906-930 may be implemented in an application, including but not limited to ADOBE® CREATIVE CLOUD® software, ADOBE® CREATIVE CLOUD® PACKAGER software, ADOBE® DOCUMENT CLOUD software, ADOBE® ACROBAT® software, ADOBE® FOTOLIA software, ADOBE® ILLUSTRATOR® software, ADOBE® LIGHTROOM® software, ADOBE® INDESIGN® software, or ADOBE® PHOTOSHOP® software. "ADOBE," "CREATIVE CLOUD," "CREATIVE CLOUD PACKAGER," "DOCUMENT CLOUD," "ACROBAT," "FOTOLIA," "ILLUSTRATOR," "LIGHTROOM," "INDESIGN," and "PHOTOSHOP" are either registered trademarks or trademarks of Adobe Systems Incorporated in the United States and/or other countries.

Figure 10:
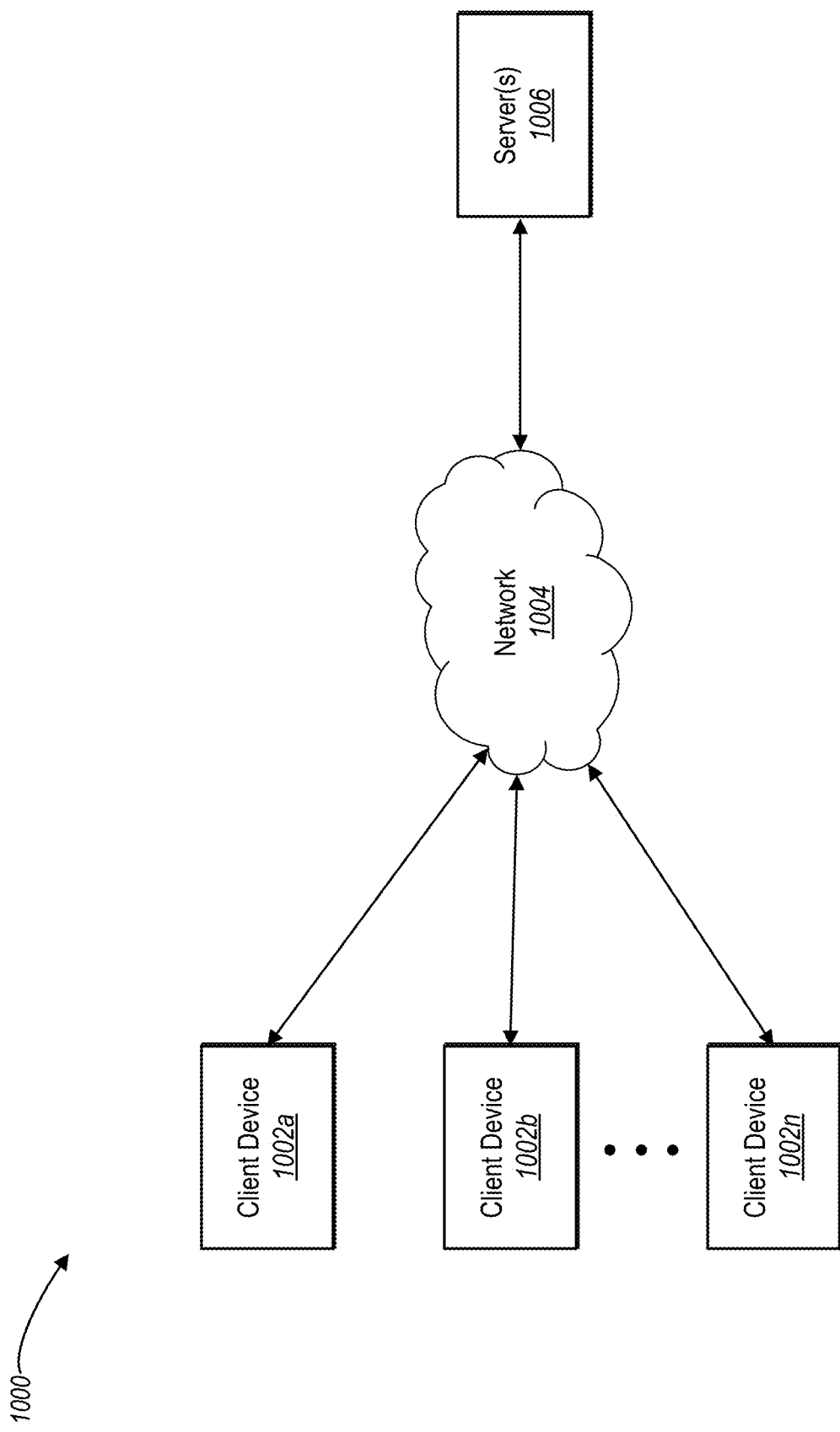
FIG. 10 illustrates a schematic diagram of an exemplary environment in which the digital identification system can operate in accordance with one or more embodiments.

FIG. 10 illustrates a schematic diagram of one embodiment of an exemplary environment 1000 in which the digital identification system 900 can operate. In one or more embodiments, the exemplary environment 1000 includes one or more client devices 1002a, 1002b, . . . 1002n, a network 1004, and server(s) 1006. The network 1004 may be any suitable network over which the computing devices can communicate. Example networks are discussed in more detail below with regard to FIG. 14.

As illustrated in FIG. 10, the environment 1000 may include client devices 1002a-1002n. The client devices 1002a-1002n may comprise any computing device. For example, client devices 1002a-1002n may comprise one or more personal computers, laptop computers, mobile devices, mobile phones, tablets, special purpose computers, televisions, or other computing devices, including computing devices described below with regard to FIG. 14. For instance, in one or more embodiments, one or more of the client devices 1002a-1002n comprise the client device 902 implementing the digital identification system 900.

In addition, the environment 1000 may also include the server(s) 1006. The server(s) 1006 may generate, store, receive, and transmit any type of data, including font repository 932, font information 934, mapping database 936, client information 938, fonts 940, accounts 942, or digital assets 944. For example, the server(s) 1006 may transmit data to a client device, such as client device 1002*a*. The server(s) 1006 can also transmit electronic messages between one or more users of the environment 1000. In one example embodiment, the server(s) 1006 comprise a content server. The server(s) 1006 can also comprise a communication server or a web-hosting server. Additional details regarding the server(s) 1006 will be discussed below with respect to FIG. 14.

As illustrated, in one or more embodiments, the server(s) 1006 can include the digital identification system 900. In particular, the digital identification system 900 can comprise an application running on the server(s) 1006 or a portion of a software application that can be downloaded from the server(s) 1006. For example, the digital identification system 900 can include a web hosting application that allows the client devices 1002*a*-1002*n* to interact with content hosted at the server(s) 1006. To illustrate, in one or more embodiments of the exemplary environment 1000, one or more client devices 1002*a*-1002*n* can access a webpage supported by the server(s) 1006. In particular, the client device 1002*a* can run a web application (e.g., a web browser) to allow a user to access, view, and/or interact with a webpage or website hosted at the server(s) 1006.

Although FIG. 10 illustrates a particular arrangement of the client devices 1002*a*-1002*n*, the network 1004, and the server(s) 1006, various additional arrangements are possible. For example, while FIG. 10 illustrates multiple separate client devices 1002*a*-1002*n* communicating with the server(s) 1006 via the network 1004, in one or more embodiments a single client device may communicate directly with the server(s) 1006, bypassing the network 1004.

Similarly, although the environment 1000 of FIG. 10 is depicted as having various components, the environment 1000 may have additional or alternative components. For example, the digital identification system 900 can be implemented on a single computing device. In particular, the digital identification system 900 may be implemented in whole by the client device 1002*a* (e.g., the client device 1002*a* may comprise the client device 902) or the digital identification system 900 may be implemented in whole by the server(s) 1006. Alternatively, the digital identification system 900 may be implemented across multiple devices or components (e.g., utilizing the client devices 1002*a*-1002*n* and the server(s) 1006, as illustrated with regard to FIG. 9).

By way of example, the client device 1002*a* can send a request to the server(s) 1006 (via the network 1004) to download a software management application. The server(s) 1006 can generate a customized digital font unique to the client device 1002*a* (e.g., via the font customizer 920) and transmit the software management application to the client device 1002*a* together with the customized digital font. The client device 1002*a* can install the software management application and utilize the software management asset (e.g., the local digital asset 914) to register the customized digital font at the client device 1002*a* (e.g., via the digital font manager 910). The client device 1002*a* can later utilize a web browser (e.g., the web application 912) to navigate to a website hosted by the server(s) 1006 (e.g., the webpage manager 922). The server(s) 1006 can send a request to the client device 1002*a* to render a webpage element that utilizes the customized digital font (e.g., via the ID detection service 924). The client device 1002*a* (via the web application 912) can render the webpage element utilizing the customized digital font. The server(s) 1006 can determine (e.g., via the font detection engine 926) whether the client device 1002*a* rendered the webpage element utilizing the customized digital font. For example the server(s) 1006 can capture an image of the webpage element rendered by the client device and utilize an OCR algorithm to identify the characters of the webpage element and determine that the characters were rendered utilizing the customized digital font. Based on a determination that the characters were rendered utilizing the customized digital font, the server(s) can authorize the client device (e.g., authorize the client device to access information stored on the server(s) 904).

Figure 11:
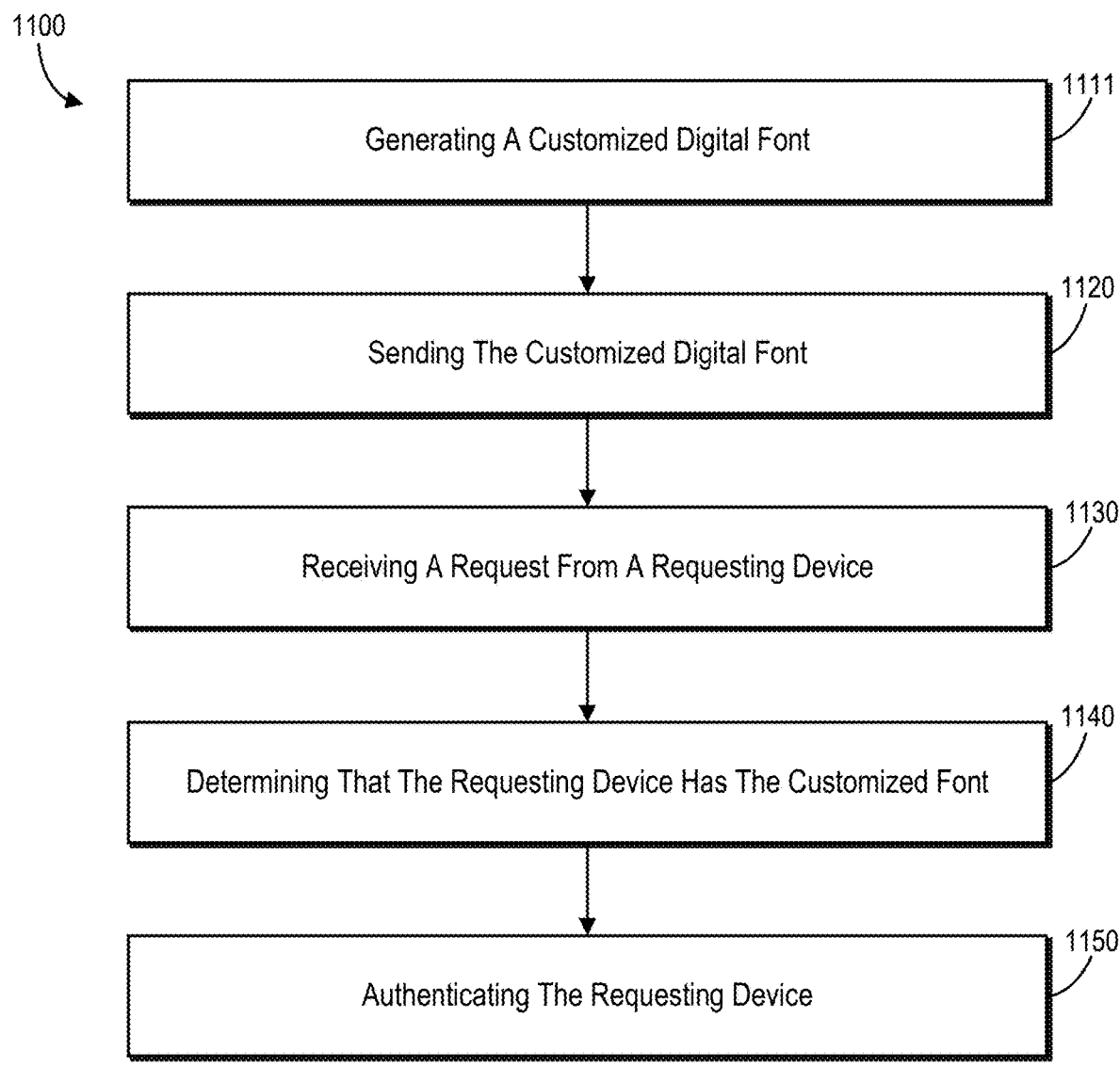
FIG. 11 illustrates a flowchart of a series of acts in a method of securely identifying a computing device in accordance with one or more embodiments.
Figure 12:
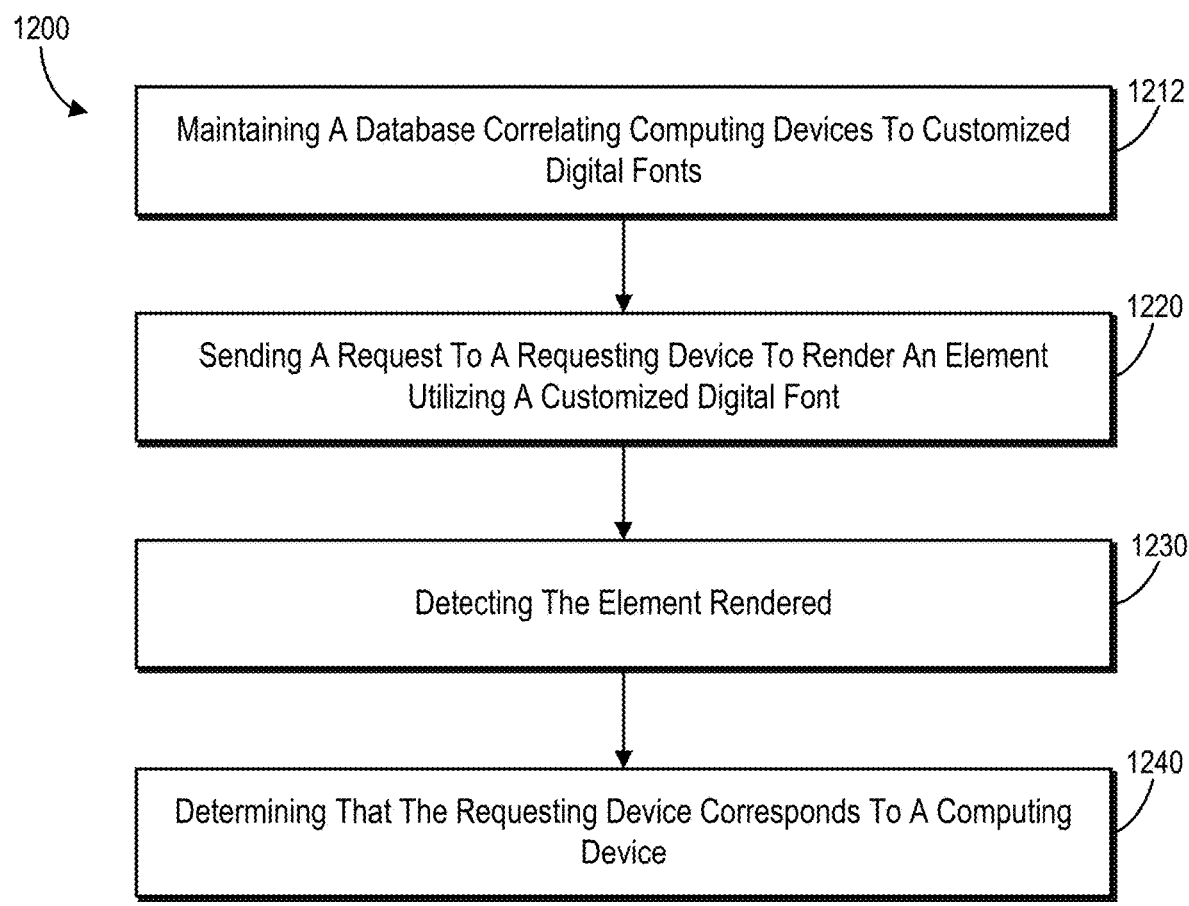
FIG. 12 illustrates another flowchart of a series of acts in a method of securely identifying a computing device in accordance with one or more embodiments.
Figure 13:
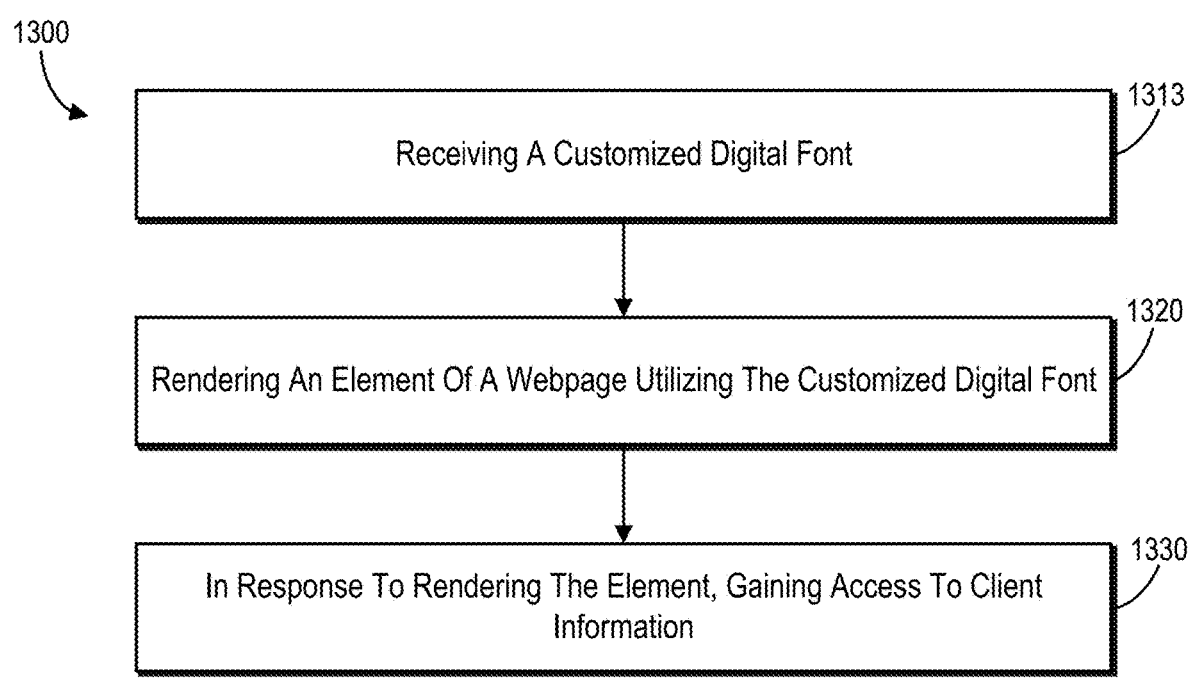
FIG. 13 illustrates another flowchart of a series of acts in a method of securely identifying a computing device in accordance with one or more embodiments.

FIGS. 1-10, the corresponding text, and the examples, provide a number of different systems and devices that securely identify a client device utilizing a customized digital font. In addition to the foregoing, embodiments can also be described in terms of flowcharts comprising acts and steps in a method for accomplishing a particular result. For example, FIGS. 11-13 illustrate flowcharts of exemplary methods in accordance with one or more embodiments. The methods described in relation to FIGS. 11-13 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart of a series of acts in a method 1100 of securely identifying a client device utilizing a customized digital font in accordance with one or more embodiments. In one or more embodiments, the method 1100 is performed in a digital medium environment that includes the digital identification system 900. The method 1100 is intended to be illustrative of one or more methods in accordance with the present disclosure, and is not intended to limit potential embodiments. Alternative embodiments can include additional, fewer, or different steps than those articulated in FIG. 11.

As illustrated in FIG. 11, the method 1100 includes an act 1110 of generating a customized digital font. In particular, the act 1110 includes generating, by at least one processor, a customized digital font. For example, in one or more embodiments, the act 1110 includes generating a digital font that is unique to the computing device; and modifying a base digital font comprising a first character order by changing the first character order of the base digital font to a second character order unique to the computing device.

Moreover, as shown in FIG. 11, the method 1100 includes an act 1120 of sending the customized digital font. In particular, the act 1120 includes sending the customized digital font to a computing device. For example, in one or more embodiments, the act 1120 includes sending a digital asset to the computing device in conjunction with the customized digital font.

In addition, as illustrated in FIG. 11, the method 1100 includes an act 1130 of receiving a request from a requesting device. As used herein, the term "requesting device" refers to a computing device requesting information from a server. In particular, the term "requesting device" includes a computing device requesting information from a server, where the server has not determined whether the computing device has one or more permissions. For example, the term "requesting device" includes a computing device requesting information from a server, where the server has not determined whether the computing device has a customized digital font. In particular, the act 1130 includes receiving a request from a requesting device via a web browser. For example, in one or more embodiments, the act 1130 includes receiving a request for a webpage from a requesting device via a web browser.

As shown in FIG. 11, the method 1100 also includes an act 1140 of determining that the requesting device has the customized digital font. In particular, the act 1140 includes determining, by the at least one processor and via the web browser, that the requesting device has the customized digital font. For example, in one or more embodiments, the act 1140 includes sending a request to the computing device to render a textual element via a web browser utilizing the customized digital font; and determining that the textual element rendered by the requesting device via the web browser uses the customized digital font.

In addition, in one or more embodiments, the act 1140 includes comparing a width of the textual element rendered by the requesting device via the web browser with a width of a second textual element. Moreover, the act 1140 can also comprise receiving an image of the textual element rendered by the requesting device via the web browser; and applying an optical character recognition algorithm to the image to identify the characters of the textual element rendered by the requesting device via the web browser.

As shown in FIG. 11, the method 1100 also includes an act 1150 of authenticating the requesting device. In particular, the act 1150 includes authenticating the requesting device based on the determination that the requesting device has the customized digital font. For example, in one or more embodiments, the act 1150 includes determining that the requesting device has the digital asset. In addition, the act 1150 can also include determining that the requesting device is the computing device to which the customized digital font was sent.

The method 1100 can also include, upon generating the customized digital font, applying the customized digital font to a reference text to create a font-based client identification; and authenticating the requesting device by determining a correspondence between the font-based client identification and the textual element rendered by the requesting device.

In one or more embodiments, the method 1100 can also comprise, based on the determination that the requesting device is the computing device, providing access to client information stored on a server. For instance, in one or more embodiments, the client information comprises at least one of the following: state information regarding one or more digital assets on the computing device; one or more updates available for the one or more digital assets on the computing device; access credentials; payment information; or demographic information.

FIG. 12 illustrates another flowchart of a series of acts in a method 1200 of passing secure digital information from a server to a client device in accordance with one or more embodiments. As illustrated in FIG. 12, the method 1200 can include an act 1210 of maintaining a database correlating computing devices to customized digital fonts. In particular, the act 1210 includes maintaining a database correlating a plurality of computing devices to a plurality of customized digital fonts.

In addition, as shown in FIG. 12, the method 1200 also includes an act 1220 of sending a request to a requesting device to render an element utilizing a customized digital font. In particular, the act 1220 includes sending a request to a requesting device to render an element utilizing a customized digital font from the plurality of customized digital fonts. For example, in one or more embodiments, each of the plurality of customized digital fonts comprises a title, and the title for each of the plurality of customized digital fonts is the same, and the act 1220 includes sending a request to the requesting device to render the element utilizing a font comprising the title. In addition, in one or more embodiments, the act 1220 includes sending a request to the requesting device to render the element via a web browser utilizing the customized digital font.

Furthermore, as illustrated in FIG. 12, the method 1200 also includes an act 1230 of detecting the element rendered. In particular, the act 1230 includes detecting the element rendered by the requesting device. For example, in one or more embodiments, the act 1230 includes receiving an image of the element rendered by the requesting device via the web browser; and identifying characters from the image of the element rendered by the requesting device via the web browser.

As shown in FIG. 12, the method 1200 also includes an act 1240 of determining that the requesting device corresponds to a computing device. In particular, the act 1240 includes determining that the requesting device corresponds to a computing device from the plurality of computing devices based on the element rendered by the requesting device being in one of the customized digital fonts of the plurality of customized digital fonts.

The method 1200 can also include sending a second request to the requesting device to render a second element utilizing the customized digital font; detecting the second element rendered by the requesting device; and comparing the element and the second element. For instance, the second request can comprise a request to render the second element utilizing a digital asset installed on the client device, wherein the digital asset is not a web browser.

FIG. 13 illustrates another flowchart of a series of acts in a method 1300 of passing secure digital information from a server to a client device in accordance with one or more embodiments. As illustrated in FIG. 13, the method 1300 can include an act 1310 of receiving a customized digital font. In particular, the act 1310 includes receiving a customized digital font from one or more servers.

As shown in FIG. 13, the method 1300 also includes an act 1320 of rendering an element of a webpage utilizing the customized digital font. In particular, the act 1320 includes rendering, by at least one processor, an element of a webpage via a web browser utilizing the customized digital font.

In addition, as illustrated in FIG. 13, the method 1300 also includes an act 1330 of, in response to rendering the element, gaining access to client information. In particular, the act 1330 includes, in response to rendering the element of the webpage utilizing the customized digital font, gaining access to client information stored on the one or more servers.

The method 1300 can also include rendering a second element utilizing the customized digital font via a software management application; and sending the second element to the one or more servers. Moreover, the method 1300 can include sending a device ID and a checksum to the one or more servers. Furthermore, the method 1300 can include, upon receiving the customized digital font from the one or more servers, generating a font-based identification based on the customized digital font; and sending the font-based identification to the one or more servers.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
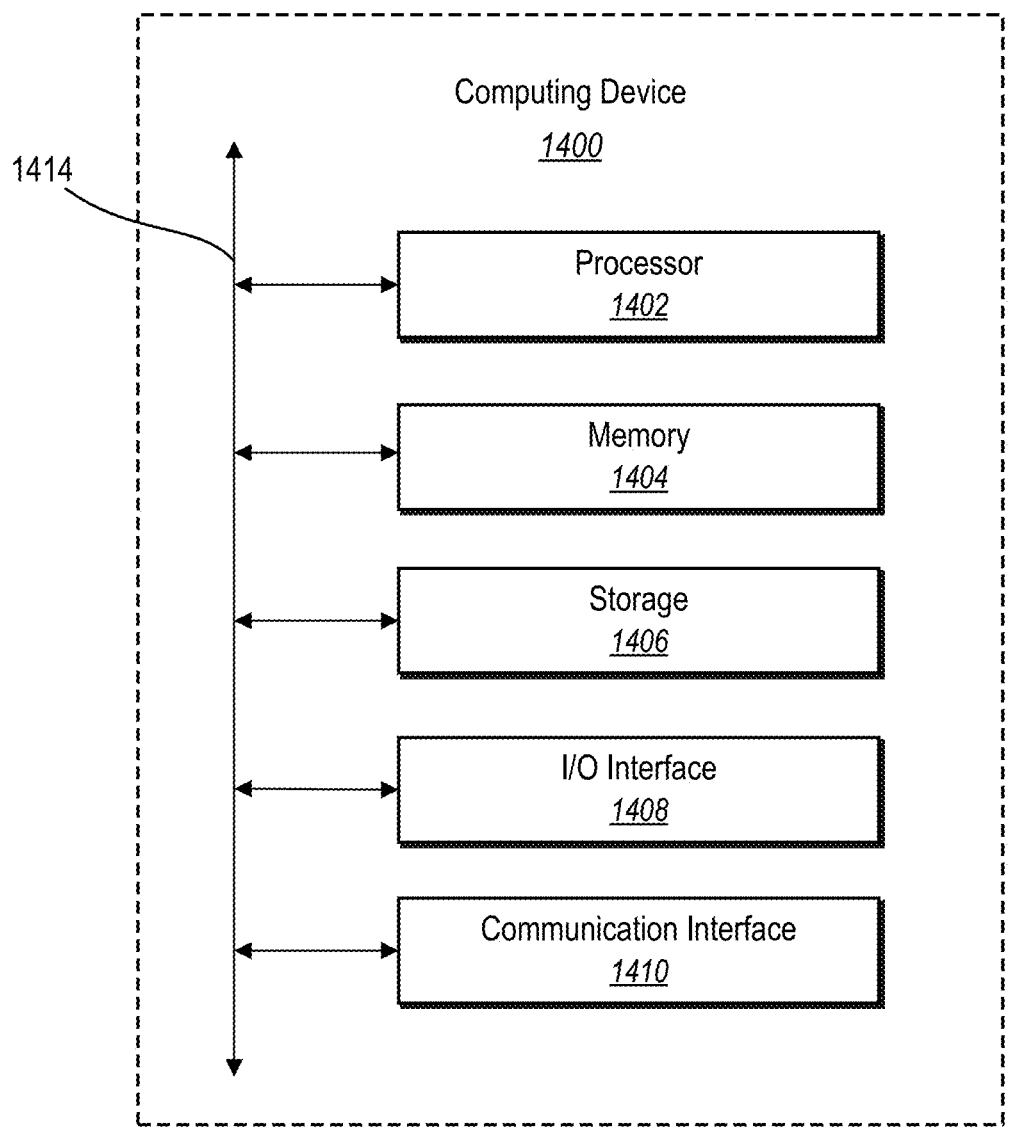
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that the digital identification system 900 can comprise implementations of the computing device 1400. As shown by FIG. 14, the computing device can comprise a processor 1402, memory 1404, a storage device 1406, an I/O interface 1408, and a communication interface 1410. While an exemplary computing device 1400 is shown in FIG. 14, the components illustrated in FIG. 14 are not intended to be limiting. Additional or alternative components may be used in other embodiments. Furthermore, in certain embodiments, a computing device 1400 can include fewer components than those shown in FIG. 14. Components of computing device 1400 shown in FIG. 14 will now be described in additional detail.

In particular embodiments, processor(s) 1402 includes hardware for executing instructions, such as those making up a computer program. As an example and not by way of limitation, to execute instructions, processor(s) 1402 may retrieve (or fetch) the instructions from an internal register, an internal cache, memory 1404, or a storage device 1406 and decode and execute them. In particular embodiments, processor(s) 1402 may include one or more internal caches for data, instructions, or addresses. As an example and not by way of limitation, processor(s) 1402 may include one or more instruction caches, one or more data caches, and one or more translation lookaside buffers (TLBs). Instructions in the instruction caches may be copies of instructions in memory 1404 or storage 1406.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example and not by way of limitation, storage device 1406 can comprise a non-transitory storage medium described above. The storage device 1406 may include a hard disk drive (HDD), a floppy disk drive, flash memory, an optical disc, a magneto-optical disc, magnetic tape, or a Universal Serial Bus (USB) drive or a combination of two or more of these. Storage device 1406 may include removable or non-removable (or fixed) media, where appropriate. Storage device 1406 may be internal or external to the computing device 1400. In particular embodiments, storage device 1406 is non-volatile, solid-state memory. In particular embodiments, storage device 1406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a stylus or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1410. As an example and not by way of limitation, computing device 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1400 may include any suitable communication interface 1410 for any of these networks, where appropriate.

The computing device 1400 can further include a bus 1412. The bus 1412 can comprise hardware, software, or both that couples components of computing device 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A system comprising:
   at least one hardware processor configured to cause the system to:
   maintain a database correlating a plurality of authorized client devices to a plurality of customized unique digital fonts, wherein each of the plurality of customized unique digital fonts comprises a title, and the title for each of the plurality of customized unique digital fonts is identical; and
   authenticate a requesting device by causing the system to:
   send computer-executable instructions to the requesting device to render an element via a web browser utilizing a customized unique digital font from the plurality of customized unique digital fonts;
   detect the element rendered by the requesting device in response to executing the computer-executable instructions by causing the system to:
      capture an image of the element rendered by the requesting device via the web browser;
      analyze the image of the element rendered by the web browser of the requesting device;
      identify characters from the image of the element rendered by the requesting device via the web browser by utilizing an optical character recognition algorithm; and
      determine that the requesting device is an authorized client device from the plurality of authorized client devices based on the element rendered by the requesting device being in one of the customized unique digital font of the plurality of customized unique digital fonts.

2. The system of claim 1, wherein:
   the at least one hardware processor is configured to cause the system to send a request to the requesting device to render the element via the web browser utilizing the customized unique digital font from the plurality of customized unique digital fonts by sending the request to the requesting device to render the element utilizing a font comprising the title.

3. The system of claim 1, wherein: the at least one hardware processor is further configured to cause the system to:
   transform the image of the element rendered by the requesting device into a plurality of characters; and
   identify the plurality of characters based on the transformed image of the element.

4. The system of claim 1, wherein that at least one hardware processor is further configured to cause the system to:
   send a second request to the requesting device to render a second element utilizing the customized unique digital font;
   detect the second element rendered by the requesting device; and
   compare the element and the second element.

5. The system of claim 4, wherein the second request comprises a request to render the second element utilizing a digital asset installed on the requesting device, wherein the digital asset is not a web browser.

6. A non-transitory computer-readable storage medium having stored thereon instructions that, when executed by at least one processor, cause the at least one processor to:
   maintain a database correlating a plurality of authorized client devices to a plurality of customized unique digital fonts, wherein each of the plurality of customized unique digital fonts comprises a title, and the title for each of the plurality of customized unique digital fonts is identical; and
   authenticate a requesting device by:
   sending computer-executable instructions to the requesting device to render an element via a web browser utilizing a customized unique digital font from the plurality of customized unique digital fonts;
   detecting the element rendered by the requesting device in response to executing the computer-executable instructions by:
      capturing an image of the element rendered by the requesting device via the web browser;
      analyzing the image of the element rendered by the web browser of the requesting device;
      identifying characters from the image of the element rendered by the requesting device via the web browser by utilizing an optical character recognition algorithm; and
      determining that the requesting device is an authorized client device from the plurality of authorized client devices based on the element rendered by the requesting device being in one of the customized unique digital font of the plurality of customized unique digital fonts.

7. The non-transitory computer-readable storage medium of claim 6, wherein the instructions, when executed by the at least one processor, further cause the at least one processor to:
   send a request to the requesting device to render the element via the web browser utilizing the customized unique digital font in response to identifying the request from the requesting device to access client information or digital assets in a digital account; and
   in response to authenticating the requesting device, provide the requesting device information or access to the digital assets in the digital account.

8. The non-transitory computer-readable storage medium of claim 6, wherein sending computer-executable instructions to the requesting device to render the element via the web browser utilizing the customized unique digital font comprises sending a request to the requesting device to render a textual element via the web browser utilizing the customized unique digital font.

9. The non-transitory computer-readable storage medium of claim 8, wherein the instructions, when executed by the at least one processor, further cause the at least one processor to:
   transform the image of the element rendered by the requesting device into a plurality of characters; and
   identify the plurality of characters based on the transformed image of the element.

10. The non-transitory computer-readable storage medium of claim 6, wherein the instructions, when executed by the at least one processor, further cause the at least one processor to: generate the customized unique digital font unique to the authorized client device by changing a character order of a base digital font to a modified character order.

11. The non-transitory computer-readable storage medium of claim 6, wherein the instructions, when executed by the at least one processor, further cause the at least one processor to: associate the customized unique digital font with a digital account associated with the authorized client device.

12. The non-transitory computer-readable storage medium of claim 6, wherein the instructions, when executed by the at least one processor, further cause the at least one processor to:
- change a character order of a base digital font to a first modified character order to generate a first customized unique digital font; and
- change the character order of the base digital font to a second modified character order to generate a second customized unique digital font.

13. The non-transitory computer-readable storage medium of claim 6, wherein the instructions, when executed by the at least one processor, further cause the at least one processor to: determine that the element rendered by the requesting device uses the customized unique digital font by comparing a width of the element rendered by the requesting device with a width of a second textual element.

14. In a digital medium environment for managing digital assets, a method of utilizing electronic fonts to securely identify and authenticate computing devices seeking to access digital assets, comprising:
- associating a plurality of authorized digital accounts to a plurality of customized unique digital fonts, wherein each of the plurality of customized unique digital fonts comprises a title, and the title for each of the plurality of customized unique digital fonts is identical; and
- authenticate a requesting device by:
- sending computer-executable instructions to the requesting device to render an element via a web browser utilizing a customized unique digital font from the plurality of customized unique digital fonts;
- capturing an image of the element rendered by the requesting device via the web browser;
- analyzing the image of the element rendered by the web browser of the requesting device:
- identifying characters from the image of the element rendered by the requesting device via the web browser to render the element utilizing a customized unique digital font from the plurality of customized unique digital fonts by utilizing an optical character recognition algorithm; and
- determining that the requesting device corresponds to an authorized digital account from the plurality of authorized digital accounts based on the element rendered by the requesting device in response to executing the computer-executable instructions being in the customized unique digital font of the plurality of customized unique digital fonts.

15. The method of claim 14, further comprising:
- sending a request to the requesting device to render the element utilizing the customized unique digital font in response to identifying the request from the requesting device to access client information in the authorized digital account; and
- in response to determining that the requesting device corresponds to the authorized digital account from the plurality of authorized digital accounts based on the element rendered via the web browser by the requesting device being in the customized unique digital font of the plurality of customized unique digital fonts, providing access to the client information in the authorized digital account of the requesting device.

16. The method of claim 14, wherein sending a request to the requesting device to render the element utilizing the customized unique digital font from the plurality of customized unique digital fonts by sending the request to the requesting device to render the element utilizing a font comprising the title.

17. The method of claim 14, further comprising determining that the element rendered by the requesting device uses the customized unique digital font by comparing a width of the element rendered by the requesting device with a width of a second textual element.

18. The method of claim 14, wherein identifying the element rendered by the requesting device comprises:
- transforming the image of the element rendered by the requesting device into a plurality of characters; and
- identifying the plurality of characters based on the transformed image of the element.

19. The method of claim 14, further comprising generating the plurality of customized unique digital fonts by:
- changing a character order of a base digital font to a first modified character order to generate a first customized unique digital font; and
- changing the character order of the base digital font to a second modified character order to generate a second customized unique digital font.

20. The method of claim 19, wherein associating the plurality of authorized digital accounts to the plurality of customized unique digital fonts comprises:
- associating the first customized unique digital font with a first digital account; and associating the second customized unique digital font with a second digital account.

* * * * *